United States Patent
Shimauchi et al.

Patent Number: 5,661,813
Date of Patent: Aug. 26, 1997

[54] METHOD AND APPARATUS FOR MULTI-CHANNEL ACOUSTIC ECHO CANCELLATION

[75] Inventors: Suehiro Shimauchi, Tokyo; Shoji Makino, Machida; Junji Kojima, Tokyo, all of Japan

[73] Assignee: Nippon Telegraph and Telephone Corporation, Tokyo, Japan

[21] Appl. No.: 547,545

[22] Filed: Oct. 24, 1995

[30] Foreign Application Priority Data

Oct. 26, 1994 [JP] Japan ................................. 6-262738
Mar. 9, 1995 [JP] Japan ................................. 7-050002

[51] Int. Cl.$^6$ ................................. H04B 3/20
[52] U.S. Cl. ................................. 381/66; 381/94.1
[58] Field of Search ................................. 381/66, 71, 94; 379/388, 389, 390, 410, 411, 412

[56] References Cited

U.S. PATENT DOCUMENTS

| | | | |
|---|---|---|---|
| 3,794,766 | 2/1974 | Cox et al. | 381/94 |
| 4,131,760 | 12/1978 | Christensen et al. | 381/66 |
| 5,323,459 | 6/1994 | Hirano | 379/390 |
| 5,327,496 | 7/1994 | Russell et al. | 381/94 |
| 5,473,686 | 12/1995 | Virdee | 381/94 |
| 5,513,265 | 4/1996 | Hirano | 379/410 |

*Primary Examiner*—Curtis Kuntz
*Assistant Examiner*—Vivian Chang
*Attorney, Agent, or Firm*—Pollock, Vande Sande & Priddy

[57] ABSTRACT

A variation in the cross-correlation between current received signals of different channels is extracted which corresponds to the cross-correlation between previous received signals, and the extracted variation is used as an adjustment vector to iteratively adjust the estimation of the impulse response of each echo path. Furthermore, by additionally providing a function of actively varying the cross-correlation between the received signals to such an extent as not to produce a jarring noise, it is possible to reconstruct acoustic signals by individual loudspeakers and utilize received signal added with the cross-correlation variation to obtain the adjustment vector for an estimated echo path vector.

21 Claims, 15 Drawing Sheets

METHOD AND APPARATUS FOR MULTI-CHANNEL ACOUSTIC ECHO CANCELLATION

BACKGROUND OF THE INVENTION

The present invention relates to a method and apparatus for multi-channel acoustic echo cancellation which cancel a room echo that causes howling and presents a psycho-acoustic problem in a teleconference system provided with a multi-receive-channel system.

With the widespread proliferation of ISDN, LAN and similar digital networks and the developments of high efficiency speech and image coding techniques in recent years, much attention is now focused on a TV conference system which allows participants to communicate with each other while watching the other's face and a multi-media communication system using personal computers or workstations which also enables data communications or the like. These systems adopt in many cases a hands-free communication system using loudspeakers and microphones to thereby create a more realistic teleconferencing environment. However, the hands-free communication system is attended with the problem of echo and howling generation; the acoustic echo canceling technique is indispensable to avoiding the problem. In fact, acoustic echo cancellers are widely used, but they are mostly for one-channel use and can cancel only an acoustic echo from one (one channel) loudspeaker to one (one channel) microphone. At present, stereo is not uncommon in many TV broadcast programs and music media, for instance, and there is also a growing demand for a multi-channel hands-free communication system. To meet this requirement, it is necessary to implement a multi-channel acoustic echo canceller which permits cancellation of acoustic echoes from a plurality of speakers (a plurality of channels) to a microphone; in recent years, technical problems and solutions thereto have been investigated very actively toward the realization of such a multi-channel echo canceller.

A description will be given, which reference to FIG. 1, of a one-channel echo canceller. In hands-free communication, speech uttered by a person at a remote place is provided as a received signal to a received signal terminal 11 and is radiated from a loudspeaker 12. In FIG. 1, k indicates discrete time and x(k) a received signal sample value. In the following description, x(k) will be referred to simply as a received signal. An echo canceller 14 cancels an echo y(k) which is produced when the received signal x(k) radiated from the loudspeaker 12 is picked up by a microphone 16 after propagating over an echo path 15. The echo y(k) can be molded by such a convolution as follows:

$$y(k) = \sum_{n=0}^{L-1} h(k,n)x(k-n) \quad (1)$$

where h(k,n) is the impulse response indicating the transfer function of the echo path 15 at time k and L is the number of taps, which is a constant preset corresponding to the reverberation time of the echo path 15. At first, received signals x(k) from the current time to L−1 are stored in a received signal storage and vector generating part 17. The L received signals thus stored are outputted as a received signal vector x(k), that is, as $$x(k)=[x(k), x(k-1), \ldots, x(k-L+1)]^T \quad (2)$$

where $*^T$ indicates a transposition. In an estimated echo generating part 18 formed by an FIR filter, the inner product of the received signal vector x(k) of Eq. (2) and an estimated echo path vector ĥ(k), which is a filter coefficient vector provided from an echo path estimating part 19, is calculated as follows:

$$ŷ(k)=ĥ^T(k)x(k) \quad (3)$$

As a result, an estimated echo or echo replica ŷ(k) is generated. This inner product calculation is equivalent to such a convolution as Eq. (1). In the echo path estimating part 19, the estimated echo path vector ĥ(k) is generated which is used in the estimated echo generating part 18. The most common algorithm which is used for the echo path estimation is an NLMS (Normalized Least Mean Square) algorithm. With the NLMS algorithm, the received signal vector x(k) at time k and a residual echo e(k), i.e. the following error, obtained by subtracting the estimated echo signal ŷ(k) from the output y(k) of the microphone 16 by a subtractor 21, $$e(k)=y(k)-ŷ(k) \quad (4)$$

are used to calculate an estimated echo path vector ĥ(k+1) which is used at time k+1, by the following equation:

$$ĥ(k+1)=ĥ(k)+\alpha e(k)x(k)/\{x^T(k)x(k)\} \quad (5)$$

where $\alpha$ is called a step size parameter, which is used to adjust adaptation within the range of $0<\alpha<2$. By repeating the above processing upon each increment of time k, the estimated echo path vector ĥ(k) in the echo path estimating part 19 gradually converges toward a true echo path vector h(k) whose elements are impulse response sequence h(k, n), (where n=0, 1, 2, ..., L−1) of the true echo path 15 at time k, that is, toward the following echo path vector:

$$h(k)=[h(k,0), h(k,1), \ldots, h(k,L-1)]^T \quad (6)$$

As the result of this, the residual echo signal e(k) given by Eq. (4) can be reduced.

In general, a teleconferencing system of the type having an N ($\geq 2$) channel loudspeaker system and an M ($\geq 1$) channel microphone system employs, for echo cancellation, such a configuration as shown in FIG. 2. That is to say, an echo cancellation system 23 is composed of N-channel echo cancellers $22_1$, $22_2$, ..., $22_M$ for processing N-input-one-output time sequence signals, which are each interposed between all of N channels of the receiving side where received signals $x_1(k)$ to $x_N(k)$ are provided to input terminals $11_1$ to $11_N$ and are radiated from loudspeakers $12_1$ to $12_N$ and one channel of the sending side composed of microphones $16_1$ to $16_M$. In this instance, the echo cancellation system has a total of N×M echo paths $15_{nm}$ ($1\leq n\leq N$, $1\leq m\leq M$). The N-channel echo cancellers $22_1$, $22_2$, ..., $22_M$, which are each connected between all of the N channels of the receiving side and one channel of the sending side, have such a configuration as shown in FIG. 3, which is an extended version of the configuration of the echo canceller 14 depicted in FIG. 1. This is described in detail, for example, in B. Widow and S. D. Stearns, "Adaptive Signal processing," Prince-Hall, Inc. pp. 198–200 (1985). Now, consider the N-channel echo canceller $22_m$ connected to the m-th channel ($1\leq m\leq M$) of the sending side. The echo signal $y_m(k)$ that is picked up the m-th channel microphone $16_m$ is obtained by adding together respective received signals of all channels at the sending side after propagation over respective echo paths $15_{1m}$ to 15Nm. Hence, it is necessary to devise how to make the echo path estimation by evaluating only one residual echo $e_m(k)$ in common to all the receiving side channels. At first, for the received signal $X_n(k)$ of each channel, the following received signal vectors are generated in the received signal storage and vector generating parts ($17_1, 17_1, \ldots, 17_N$):

$$x_1(k) = [x_1(k), x_1(k-1), \ldots, x_1(k-L_1+1)]^T \quad (7)$$
$$x_2(k) = [x_2(k), x_2(k-1), \ldots, x_2(k-L_2+1)]^T$$

$$\vdots$$

$$x_N(k) = [x_N(k), x_N(k-1), \ldots, x_N(k-L_N+1)]^T$$

where $L_1, L_2, \ldots, L_N$ are numbers of taps, which are constants preset corresponding to reverberation times of the respective echo paths $15_{1m}, 15_{1m}, \ldots, 15_{Nm}$. The vectors thus generated are combined in a vector combining part 24 as follows:

$$x(k) = [x_1^T(k), x_2^T(k), \ldots, x_N^T(k)]^T \quad (8)$$

Also in the echo path estimating part $19_m$, estimated echo path vectors $\hat{h}_{1m}(k), \hat{h}_{2m}(k), \ldots, \hat{h}_{Nm}(k)$, which are used to simulate N echo paths between the respective receiving side channels and the m-th sending side channel, are combined as follows:

$$\hat{h}_m(k) = [\hat{h}_{1m}^T(k), \hat{h}_{2m}^T(k), \ldots, \hat{h}_{Nm}^T(k)]^T \quad (9)$$

In the case of using the NLMS algorithm, the updating of the combined estimated echo path vector $\hat{h}_m(k)$ is done as follows:

$$\hat{h}_m(k+1) = \hat{h}_m(k) + \alpha e_m(k) x(k) / \{x^T(k) x(k)\} \quad (10)$$

In the estimated echo generating part $18_m$, an estimated echo $\hat{y}_m(k)$ for the echo $y_m(k)$ picked up in the m-th sending channel is generated by the following inner product calculation:

$$\hat{y}_m(k) = \hat{h}_m^T(k) x(k) \quad (11)$$

By combining vectors in the respective channels into one vector, the flow of basic processing becomes the same as in the one-channel echo canceller of FIG. 1.

Of the defects of the conventional echo cancellation system for application to the teleconferencing system composed of an N-channel speaker system and an M-channel microphone system, the defect that the present invention is to solve will be described in connection with a two-channel stereo teleconferencing system. Referring now to FIG. 4, speaker/microphone systems at points A and B which are connected via a network NW respectively comprise two speakers $12a_1, 12a_2$ and $12b_1, 12b_2$ and two microphones $16a_1, 16a_2$ and $16b_1, 16b_2$. Between two receiving channels and each sending channel there are provided echo cancellers $22a_i, 22a_2$ and $22b_1, 22b_2$.

In the case of applying the conventional echo canceller to the stereo teleconferencing system which sends and receives signals between the points A and B over two channels, there is presented a problem that each time a speaker at the point A moves or changes to another, person who becomes a speaker an echo from the point B by the speech at the point A increases even if the echo paths $15_{11}$ and $15_{21}$ remain unchanged. The reason for this is that the echo path impulse responses are not correctly estimated in the echo cancellation system at the Point B side.

To explain this problem, attention is paid to the operation of the echo canceller $22b_1$ connected to a first sending channel of the echo cancellation system at the point B. Let two-channel received signal vectors be represented as $x_1(k)$ and $x_2(k)$. Letting echo path vectors of true echo paths $15_{11}$ and $15_{21}$ of the respective receiving channels be represented as $h_{11}(k)$ and $h_{21}(k)$, respectively, an echo $y_1(k)$ that is picked up by the microphone $16_{b1}$ is given by $$y_1(k) = h_{11}^T(k) x_1(k) + h_{21}^T(k) x_2(k) \quad (12)$$

On the other hand, an estimated echo $\hat{y}_1(k)$ that is generated in the echo canceller is expressed by the following equation using estimated echo path vectors $\hat{h}_{11}(k)$ and $\hat{h}_{21}(k)$ that are generated in the echo canceller:

$$\hat{y}_1(k) = \hat{h}_{11}^T(k) x_1(k) + \hat{h}_{21}^T(k) x_2(k) \quad (13)$$

When one speaker speaks or utters speech at the point A, the received signal vectors $x_1(k)$ and $x_2(k)$ have a very strong cross-correlation. When the received signal vectors $x_1(k)$ and $x_2(k)$ have a constant high cross-correlation, the combined vector $\{\hat{h}_{11}^T(k), \hat{h}_{21}^T(k)\}$ as the solution of the following equation (14) exists infinitely, forming a subspace $H_x$ inherent in the cross-correlation between the received signal vectors $x_1(K)$ and $x_2(k)$.

$$\hat{y}_1(k) = y_1(k) \quad (14)$$

On this account, in the case of using an ordinary iterative error minimization algorithm such as the NLMS algorithm, the combined vector $\{\hat{h}_{11}^T(k), \hat{h}_{21}^T(K)\}$ converges to a point in subspace $H_x$ nearest the initial point; in general, it does not converge to the true value $\{h_{11}^T(k), h_{21}^T(k)\}$.

For simplicity, consider the case where the received signal vectors $x_1(k)$ and $x_1(k)$ are expressed by constant scalar values $p_1$ and $p_2$ and the source signal vector $s(k)$ as follows:

$$x_1(k) = p_1 s(k), \quad x_2(k) = p_2 s(k) \quad (15)$$

The subspace $H_x$ where $[\hat{h}_{11}^T(k), \hat{h}_{21}^T(k)]$ is allowed to exist can be regarded as a straight line Al in FIG. 5A which satisfies the following equation:

$$p_1 \hat{h}_{11}(k) + p_2 \hat{h}_{21}(k) = p_2 b_{21}(k) \quad (16)$$

When the adaptation starts from the initial value (0, 0), the steady-state solution $[\hat{h}_{11p}^T(k), \hat{h}_{21p}^T(k)]$ is obtained as follows:

$$\hat{h}_{11p}(k) = \{h_{11}(k) + h_{21}(k) p_2/p_1\} p_1^2/(p_1^2 + p_2^2) \neq h_{11}(k) \quad (17)$$

$$\hat{h}_{21p}(k) = \{h_{11}(k) p_1/p_2 + h_{21}(k)\} p_2^2/(p_1^2 + p_2^2) \neq h_{21}(k) \quad (18)$$

Hence, Eq. (16) is no longer satisfied when the rate between the scalar values $p_1$ and $p_2$ varies, with the result that no echo can be canceled and the echo increases accordingly.

As above, in the case of applying the conventional echo canceller to the teleconferencing system composed of an N-channel loudspeaker system and an M-channel microphone system, if received signals of the respective channels have a cross-correlation, the echo path impulse responses cannot correctly be estimated—this poses the problem that the echo increase whenever the cross-correlation between the received signal varies.

SUMMARY OF THE INVENTION

It is therefore an object of the present invention to provide a method and apparatus for echo cancellation for a multi-channel teleconferencing system which enable echo paths to be correctly estimated regardless of the cross-correlation between multi-channel received signals, and hence permit cancellation of echoes even if the cross-correlation changes.

In one aspect, the present invention is directed to an N-channel echo cancellation method which comprises the steps of:

(a) radiating an input signal $x_n(k)$ of each channel n (n=1, ..., N) as an acoustic signal by a loudspeaker of each channel, said input signal being inputted as a sample every discrete time k and N being an integer equal to or greater than 2;

(b) picking up said N acoustic signals propagating through N echo paths from said N loudspeaker to one microphone to obtain an echo y(k);

(c) obtaining a combined input signal vector $x(k)=[x_1^T(k), x_2^T(k), \ldots, x_N^T(k)]^T$ by combining input signal vectors $x_n(k)$ of said N channels, each composed of input signal sequences $x_n(k), x_n(k-1), \ldots, x_n(k-L_n+1)$ back to time $L_n-1$ in each channel n;

(d) generating an estimated echo ŷ(k) by inputting said combined input signal vector x(k) into a combined estimated echo path which has a combined estimated impulse response vector ĥ(k) obtained by combining estimated impulse response vectors $\hat{h}_n(k)$ (n=1, ..., N) of N echo paths estimated for said N echo paths, each of said N estimated echo paths having $L_n$ tape;

(e) obtaining a residual echo e(k) by subtracting said estimated echo signal y(k) from said echo y(k) picked up by said one microphone;

(f) extracting a variation in the cross-correlation between said input signals of said respective channels by using said residual echo e(k) and said combined input signal vector x(k);

(g) generating an adjustment vector v(k) on the basis of said variation in said cross-correlation;

(h) adjusting said combined estimated impulse response vector ĥ(k) of said combined estimated echo path by using said adjustment vector v(k) to obtain a combined estimated impulse response vector ĥ(k+1) at the next time k+1; and (i) repeating said steps (a) to (h) upon each increment of time k.

In another aspect, the present invention is directed to an N-channel echo cancellation method which comprises the steps of:

(a) radiating an input signal $x_n(k)$ of each channel n (n=1, ..., N) as an acoustic signal by a loudspeaker of each channel, said input signal being inputted as a sample every discrete time k and N being an integer equal to or greater than 2;

(b) picking up said N acoustic signals propagating through N echo paths from N loudspeakers to one microphone to obtain an echo y(k);

(c) obtaining a combined input signal vector $x(k)=[x_1^T(k), x_2^T(k), \ldots, x_N^T(k)]^T$ by combining input signal vectors $x_n(k)$ of said N channels, each composed of input signal sequences $x_n(k), x_n(k-1), \ldots, x_n(k-L_n+1)$ back to time $L_n-1$ in each channel;

(d) calculating an estimated approximate echo by a convolution $z^T(k)x(k)$ and inputting said combined input signal vector x(k) into a combined estimated approximate echo path which has a combined estimated approximate impulse response vector z(k) obtained by combining estimated approximate impulse response vectors $z_n(k)$ (n=1, ..., N) of N estimated echo paths for said N echo paths, each of said N estimated echo paths having $L_n$ taps;

(e) calculating an auto-correlation vector $r_{p-1}(k)$ of said combined input signal vector x(k);

(f) generating a supplementary estimated echo from said auto-correlation vector $r_{p-1}(k)$ and a smoothing coefficient vector $s_{p-1}(k-1)$ at time k−1;

(g) calculating the sum of said estimated approximate echo and said supplementary estimated approximate echo and outputting it as an estimated echo y(k) for said echo;

(h) calculating a residual echo e(k) by subtracting said estimated echo y(k) from said echo y(k) picked up by said one microphone;

(i) detecting, as pre-filter coefficients $\beta_1, \ldots, \beta_p$, variations in the cross-correlation between said input signals by using current and previous ones of said residual echo e(k) and said combined input signal vector x(k);

(j) generating a smoothing coefficient vector $s_{p-1}(k)$ by smoothing said pre-filter coefficients;

(k) adjusting said estimated approximate impulse response z(k) on the basis of said smoothing coefficient vector $s_{p-1}(k)$ and said previous combined input signal vector x(k−p+1) to obtain z(k+1); and (l) repeating said steps (a) to (k) upon each increment of time k.

In still another aspect, the present invention is directed to an echo cancellation method for a multi-channel teleconferencing system, which comprises the steps of:

(a) adding a variation to the cross-correlation between input signals of respective channels;

(b) radiating, as an acoustic signal, said input signal of each channel added with said variation, by a loudspeaker for each channel;

(c) picking up said acoustic signal propagating through each echo path from said loudspeaker to a microphone;

(d) subtracting an estimated echo from said microphone and calculating an adjustment vector on the basis of the resulting residual echo and said input signal of said each channel added with said variation;

(e) iteratively adjusting the estimation of impulse response of said each echo path by using said adjustment vector;

(f) generating estimated echo paths each having said adjusted impulse response; and (g) generating said estimated echo by applying a corresponding one of said input signals to each of said estimated echo paths.

The echo cancellers according to the present invention have configurations for performing the steps of the first-, second- and third-mentioned methods, respectively.

DESCRIPTION OF THE PREFERRED EMBODIMENTS

The first- or second-mentioned method of the present invention will be described concretely. A description will be given first of the operation of the echo path estimating part of the multi-channel echo canceller in the case where the cross-correlation between multi-channel received signals varies.

Figure 5A:
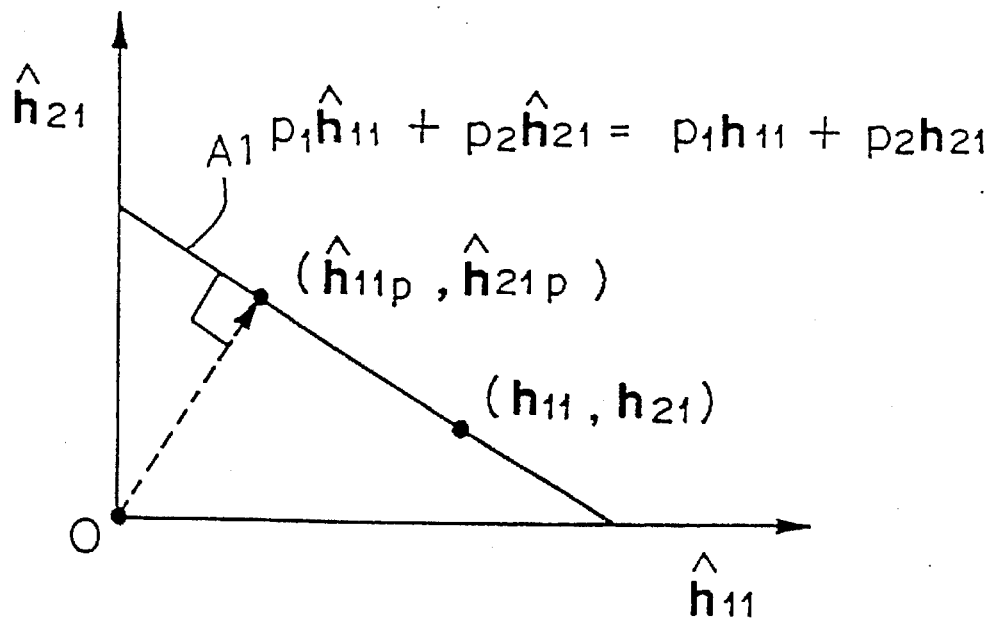
FIG. 5A is a graph showing an echo path estimating operation when received signals have a cross-correlation.
Figure 5B:
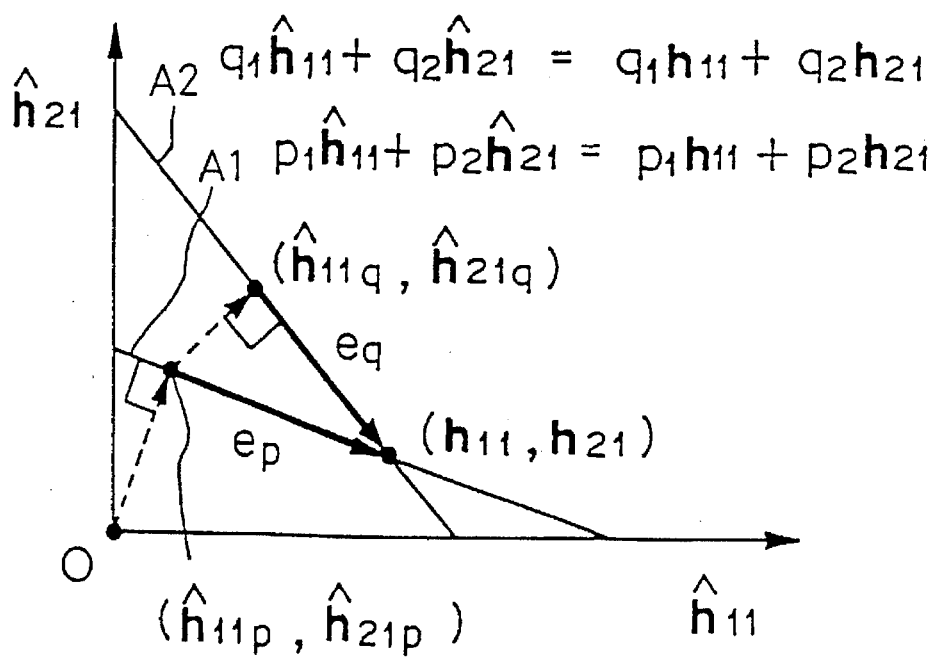
FIG. 5B is a graph showing an echo path estimating operation when the cross-correction varies.

For brevity, consider that as a variation in the cross-correlation between the two-channel stereo received signals $x_1(k)$ and $x_2(k)$ expressed by Eq. (15), the scalar values $p_1$ and $p_2$ in Eq. (15) change to $q_1$ to $q_2$, where the ratio of $q_1:q_2$ is different from that of $p_1:p_2$. The estimated echo path vector $\{\hat{h}_{11}^T(k), \hat{h}_{21}^T(k)\}$ converges first to $\{\hat{h}_{11p}^T(k), \hat{h}_{21p}^T(k)\}$ of Eqs. (17) and (18). Next, when the scalar values $p_1$ and $p_2$ change to $q_1$ and $q_2$, the estimated echo path vector converges to a point $\{\hat{h}_{11q}^T(k), \hat{h}_{21q}^T(k)\}$ of the shortest distance from an initial value $\{\hat{h}_{11p}^T(k), \hat{h}_{21p}^T(k)\}$. This operation is interpreted geometrically as shown in FIG. 5B. Here, the steady-state solution $\{\hat{h}_{11q}^T, \hat{h}_{21q}^T\}$ is the intersection of a straight line $$q_1\hat{h}_{11}+q_2\hat{h}_{21}=q_1h_{11}+q_2h_{21}$$

and its perpendicular line which includes $\{h_{11p}^T, h_{21p}^T\}$. Accordingly, it is obvious that the norm of filter coefficient error vectors $e_p$ and $e_q$ generally bear a relationship $\|e_p\| > \|e_q\|$. This means that upon each variation in the cross-correlation between the received signals, the norm of the filter coefficient error vector becomes smaller. That is to say, the variation in the cross-correlation between the multi-channel received signals causes an increase in echo when the echo path estimation is incorrect in the echo canceller, but it can be considered as effective information that permits estimation of the true echo path in the echo path estimating part after the variation in the cross-correlation repeats an infinite number of times. In the past, since such a fact has not been noticed, the cross-correlation between multi-channel received signals has been treated as fixed; therefore, it could have been not supposed that the norm of the error vector becomes small.

As described previously, the present invention extracts and utilizes information on the variation in the cross-correlation between received signals of respective channels. In the present invention, the multi-channel received signal vectors are combined into a single vector. On this account, the variation in the cross-correlation between the received signals of the respective channels appears in the auto-correlation which is the correlation between the current combined received signal vector and the past combined received signal vector. Hence, to remove an unvaried component of the cross-correlation of the received signal of each channel to extract therefrom a varied component of the cross-correlation, it is possible to use a scheme that reduces the auto-correlation of the combined received signal vector, that is, removes its auto-correlation.

This can be done by a decorrelation scheme using a projection algorithm, RLS algorithm or linear prediction, which are applied to the conventional one-channel echo canceller. Of these schemes, the scheme using linear prediction is to linearly predict a speech signal and remove its auto-correlation by using the linear predictive coefficients. The RLS algorithm can be regarded as a specific form of the projection algorithm. Thus, the projection algorithm will be described below as an example of the most practical decorrelation scheme.

The projection algorithm has been proposed as a scheme for improving the convergence speed of a speech or similar signal having a high auto-correlation. The projection algorithm is described in detail in Ozeki and Umeda, "An Adaptive Filtering Algorithm Using an Orthogonal Projection to an Affine Subspace and Its Properties," Journal of Institute of Electronics, Information and Communication Engineers of Japan (A), J67-App. 126–132, (1984-2).

In general, a p-th order projection algorithm for multi-channel inputs adjusts or corrects the estimated echo path vector $\hat{h}(k)$ in such a manner as to obtain correct outputs $y(k), y(k-1), \ldots, y(k-p+1)$ with respect to p previous input signal vectors $x(k), x(k-1), \ldots, x(k-p+1)$. That is to say, an estimated echo path vector $h(k+1)$ is calculated which satisfies the following conditions:

$$x^T(k)\hat{h}(k+1)=y(k)$$

$$x^T(k-1)\hat{h}(k+1)=y(k-1): x^T(k-p+1)\hat{h}(k+1)=y(k-p+1) \quad (19)$$

where $$x(k)=[x_1^T(k), x_2^T(k), \ldots, x_N^T(k)]^T$$

and $$x_1(k) = [x_1(k), x_1(k-1), \ldots, x_1(k-L_1+1)]^T \quad (20)$$
$$x_2(k) = [x_2(k), x_2(k-1), \ldots, x_2(k-L_2+1)]^T$$
$$\vdots$$
$$x_N(k) = [x_n(k), x_N(k-1), \ldots, x_N(k-L_N+1)]^T$$

When the number p of the equation is smaller than the number of unknowns (the number of taps), $L=L_1+L_2+\ldots L_N$, the solution $\hat{h}(k+1)$ of the simultaneous equations of Eq. (19) is indefinite. Then, the estimated echo path vector is adjusted or corrected in such a manner as to minimize the magnitude of adjustment $\|\hat{h}(k+1)-\hat{h}(k)\|$. The p-th order projection algorithm is expressed by the following equation:

$$\begin{aligned}\hat{h}(k+1) &= \hat{h}(k)+\alpha\,[X^T(k)]^+e_p(k) \\ &= \hat{h}(k)+\alpha X(k)[X^T(k)X(k)]^{-1}e_p(k) \\ &= \hat{h}(k)+\alpha X(k)g_p(k) \\ &= \hat{h}(k)+\alpha[\beta_1 x(k)+\beta_2 x(k-1)+\ldots+\beta_p x(k-p+1)]\end{aligned} \quad (21)$$

where $$x(k)=[x(k), x(k-1), \ldots, x(k-p+1)] \quad (22)$$

$$e_p(k)=\{e(k), (1-\alpha)e(k-1), \ldots, (1-\alpha)^{p-1}e(k-p+1)\}^T \quad (23)$$

$$e_p(k)=y(k)-\hat{h}(k) \quad (24)$$

$$\hat{h}(k)=\hat{h}^T(k)x(k) \quad (25)$$

$$g_p(k)=[\beta_1, \beta_2, \ldots, \beta_p]^T \quad (26)$$

+: generalized inverse matrix
−1: inverse matrix.

In the above $g_p(k)$ is a solution of the following simultaneous linear equations with p unknowns $$[X^T(k)X(k)]g_p(k)=e_p(k) \quad (27)$$

and it indicates coefficients of the variation in the cross-correlation between the received signal vectors $x_1(k)$ to $x_N(k)$ by changes in time k. The second terms having the coefficient $\alpha$ on the right side of Eq. (21) is the adjustment vector, with which the estimated echo path vector is iteratively updated. For the projection algorithm, there have been proposed several fast calculation methods intended to reduce the computational complexity; such methods are described in detail in Japanese Pat. Appln Nos. 102419.94 and 184742/93. The case where the input/output at the minus time is made zero and p is set at infinity corresponds to the RLS algorithm.

In the case of adjusting the estimated echo path vector $\hat{h}(k)$ by the conventional NLMS algorithm based on Eq. (10), it is adjusted in the direction of the input signal vector $x(k)$. On the other hand, according to the first method of the present invention, the second term on the right side of the fourth equation of Eq. (21) by the projection algorithm is set as follows:

$$v(k)=\beta_1 x(k)+\beta_2 x(k-1)+\ldots+\beta_p x(k-p+1) \quad (28)$$

and the estimated echo path vector $\hat{h}(k)$ is adjusted in the direction of the vector $v(k)$, that is, in the direction in which the correlation to all of p−1 previous combined input signal vectors $x(k-1), \ldots, x(k-p+1)$ has been removed from the combined vector $x(k)$ of the multi-channel input signals. In other words, the coefficients $\beta_1$ to $\beta_p$ are determined so that the vector $v(k)$ becomes a signal having removed similar previous combined input signal vectors from the combined input signal vector. Such coefficients $\beta_1$ to $\beta_p$ can be obtained by calculating the vector $g_p(k)$ which satisfies Eq. (27). While $\alpha v(k)$ is used as the adjustment vector in Eq. (21), $v(k)$ will hereinafter be referred to as an adjustment vector. When the combined received signal vector $x(k)$ is a combined vector of multi-channel signal vectors having a high cross-correlation, the vector $v(k)$ of Eq. (28) becomes a vector having the variation in the cross-correlation emphasized, with the non-varying component removed.

As described previously, the prior art does not recognize that when the cross-correlation between multi-channel received signals varies, the norm of the error vector of the estimated filter coefficients (the estimated echo path vector) becomes small; only in increase in echo is recognized in the prior art. Hence, the model is simplified and it is assumed that a state change which causes the variation in the cross-correlation, such as the shift or change of the speaker, does not occur. Accordingly there has not been recognized in the prior art an essential difference between the NLMS algorithm and the projection algorithm as to whether the true transfer function of the echo path can be estimated or not when they are applied to the multi-channel echo canceller; hence, the effectiveness of the projection algorithm in the estimation of the true echo path has not been recognized. According to the present invention, attention is directed to the case where the cross-correlation varies, and the variation is extracted for use as the adjustment vector—this has clarified that the estimated transfer function of the estimated echo path can be made to converge to the true transfer function of the echo path at high speed.

In Eq. (27), $X_p^T(k)X_p(k)$, which is a matrix with p rows and p columns, is a p-th order covariance matrix or auto-correlation matrix and will hereinafter be identified as follows:

$$R_p(k)=X_p^T(k)X_p(k) \quad (29)$$

The coefficients $\beta_1, \beta_2, \ldots, \beta_p$ in Eq. (28) will hereinafter be referred to as pre-filter coefficients, and a vector using them as elements is expressed by the following equation (30) and will be referred to as pre-filter coefficient vector.

$$g_p(k)=[\beta_1, \beta_2, \ldots, \beta_p]^T \quad (30)$$

The pre-filter coefficient vector $g_p(k)$ can be calculated by a recursion formula composed of the following two equations:

$$g_p(k)=(1-\alpha)\begin{bmatrix}0\\f_{p-1}(k-1)\end{bmatrix}+\frac{a_p^T(k)e(k)}{F(k)}a_p(k) \quad (31)$$

$$\begin{bmatrix}f_{p-1}(k-1)\\0\end{bmatrix}=g_p(k-1)-\frac{b_p^T(k-1)e(k-1)}{B(k-1)}b_p(k-1) \quad (32)$$

where $a_p(k)$ is a p-th order forward linear prediction coefficient vector which satisfies a normal equation $R_p(k)a_p(k)=[F(k), 0, \ldots, 0]^T$ concerning the input signal $x(k)$ and its leading element is 1. F(k) is the minimum value of the sum of forward a posteriori prediction-error squares. $b_p(k-1)$ is a p-th order backward linear prediction coefficient vector which satisfies a normal equation $R_p(k-1)b_p(k-1)=[0, \ldots, B(k-1)]^T$, and its last element is 1. $B(k-1)$ is the minimum value of the sum of backward a posteriori prediction-error squares. It is disclosed in J. M. Cioffi and T. Kailath, "Windowed fast transversal adaptive filter algorithms with normalization," IEEE Trans. Acoust., Speech, Signal Processing, vol. ASSP-33, No. 3, pp. 607–625 that the linear prediction coefficient vectors $a_p(k)$, $b_p(k-1)$ and the minimum values of the sum of a posteriori prediction-error squares $F(k)$ and $B(k-1)$ can be calculated at high speed with a small amount of calculation through utilization of, for instance, FTF (Fast Transversal Filter) algorithm. $f_{p-1}(k)$ is called a pre-filter conductor coefficient vector and is given by the following equation:

$$f_{p-1}(k)=R_{p-1}(k)^{-1}e_{p-1}(k) \tag{33}$$

By substituted elements of the pre-filter coefficient vector $g_p$, obtained from Eqs. (31) and (32), into Eq. (28), the adjustment vector $v(k)$ can be calculated with a small amount of calculation.

While in the above the multi-channel projection algorithm has been described in connection with the case where the adjustment vector $v(k)$ is derived from the pre-filter coefficient vector $g_p(k)$ and is used to adjust the estimated transfer function (the estimated echo path vector $\hat{h}(k)$ by Eq. (21), it is possible to obtain the estimated echo $\hat{y}_m(k)$ from the pre-filter coefficient vector $g_p(k)$ at high speed and with less computational complexity instead of calculating the adjustment vector $v(k)$, as described below. At first, the auto-correlation vector $r_{p-1}(k)$ of the input signal vector $x(k)$ of each channel is defined by the following equation:

$$r_{p-1}(k)=[x^T(k)x(k-1), x^T(k)x(k-2), \ldots, x^T(k)x(k-p+1)]^T \tag{34}$$

The pre-filter coefficients $\beta_i$, which are the elements of the pre-filter coefficient vector, are smooth by the following equation to define smoothing coefficients $s_i(k)$:

$$\begin{aligned} s_i(k) &= s_{i-1}(k-1)+\alpha\beta_i(k) \quad \text{for } 2 \leq i \leq p \\ &= \alpha\beta_i(k) \quad \text{for } i=1 \end{aligned} \tag{35}$$

An approximate transfer function $z(k)$ which approximates the estimated transfer function $\hat{h}(k)$ is defined by the following equation:

$$\begin{aligned} z(k+1) &= z(k)+\{\beta_p(k)+\beta_{p-1}(k-1)+\ldots+ \\ &\quad \beta_2(k-p+2)+\beta_1(k-1)\}x(k-p+1) \\ &= z(k)+s_p(k)x(k-p+1) \end{aligned} \tag{36}$$

Furthermore, defining by the following equation a smoothing coefficient vector $s_{p-1}(k-1)$ which uses the smoothing coefficients $s_i(k)$ ($i=1, \ldots, p\_1$) of Eq. (35) as its elements:

$$s_{p-1}(k-1)=[s_1(k-1), s_2(k-1), \ldots, s_{p-1}(k-1)]^T \tag{37}$$

the estimated echo $\hat{y}_m(k)$ can be calculated by the following equation from the inner product $r_{p-1}^T(k)s_{p-1}(k-1)$ and the convolution $z^T(k)x(k)$:

$$\hat{y}_m(k)=z^T(k)x(k)+r_{p-1}^T(k)s_{p-1}(k-1) \tag{38}$$

A description will be given of a concrete procedure of the above-mentioned multi-channel fast projection algorithm for the m-th channel echo $y_m(k)$. Step S1: As initialization processing, the auto-correlation vector of Eq. (36) at time $k=0$ is set by the following equation:

$$r_{p-1}(0)=[x^T(0)x(-1), x^T(0)x(-2), \ldots, x^T(0)x(-p+1)]^T \tag{39}$$

and the residual echo $e_p(k)$, the pre-filter conductor coefficient vector $f_{p-1}(k)$, the smoothing coefficient vector $s_{p-1}(k)$ and the minimum values of the sum of a posterior prediction-error squares $F(k)$ and $B(k)$ at time $k=0$ are respectively set as follows:

$e_p(0)=0$ $f_{p-1}(0)=s_{p-1}(0)=0$ $F(0)=B(0)=\delta$ where $\delta$ is a small positive constant. Step S2: Input signal vectors of N channels are calculated as follows:

$$\begin{aligned} x_1^{(p-1)}(k) &= [x_1(k), x_1(k-1), \ldots, x_1(k-p+2)]^T \\ x_2^{(p-1)}(k) &= [x_2(k), x_2(k-1), \ldots, x_2(k-p+2)]^T \\ &\vdots \\ x_N^{(p-1)}(k) &= [x_n(k), x_N(k-1), \ldots, x_N(k-p+2)]^T \end{aligned} \tag{40}$$

The correlation vector at time $k-1$ is used to calculate the correlation vector at time $k$ by the following equation:

$$\begin{aligned} r_{p-1}(k) &= r_{p-1}(k-1)+x_1(k)x_1^{(p-1)}(k-1) - \\ &\quad x_1(k-L)x_1^{(p-1)}(k-L-1)+x_2(k)x_2^{(p-1)}(k-1) - \\ &\quad x_2(k-L)x_2^{(p-1)}(k-L-1) \ldots +x_N(k)x_N^{(p-1)}(k-1) - \\ &\quad x_N(k-L)x_N^{(p-1)}(k-L-1) \end{aligned} \tag{41}$$

Step S3: The estimated echo $\hat{y}_m(k)$ is calculated by the following equation:

$$\hat{y}_m(k)=z_m^T(k)x(k)+r_{p-1}^T(k)s_{p-1}(k-1) \tag{42}$$

Step S4: The residual echo $e_m(k)$ is calculated by the following equation:

$$e_m(k)=y_m(k)-\hat{y}_m(k) \tag{43}$$

Step S5:

$$e_p(k)=[e_m(k),(1-\alpha)e_m(k-1), \ldots,(1-\alpha)^{p-1}e_m(k-p+1)]^T \tag{44}$$

is calculated by the following iterative equation:

$$\begin{bmatrix} e_p(k) \\ * \end{bmatrix} = \begin{bmatrix} e_m(k) \\ (1-\alpha)e_p(k-1) \end{bmatrix} \tag{45}$$

where the value * is not required. Step S6: By using the aforementioned fast calculation methods by J. M. Cioffi and T. Kailath for the linear prediction coefficients and the minimum values of the sum of forward and backward a posteriori prediction-error squares, a p-th order forward linear prediction coefficient vector $a_p(k)$, its minimum value of the sum of forward a posteriori prediction-error squares $F(k)$, a p-th order backward linear prediction coefficient vector $b_p(k)$ and its minimum value of the sum of backward a posteriori prediction-error squares $B(k)$ are calculated which satisfy the following equations:

$$X^T(k)X(k)a_p(k)=[F(k), 0, \ldots, 0]^T \tag{46}$$

$$X^T(k-1)X(k-1)b_p(k-1) = \{0, \ldots, B(k-1)\}^T \quad (47)$$

where the leading element of the vector $a_p(k)$ and the last element of the vector $b_p(k)$ are both 1s. Step S7: The pre-filter coefficient vector $g_p(k)$ is calculated by the following equation:

$$g_p(k) = (1-\alpha)\begin{bmatrix} 0 \\ f_{p-1}(k-1) \end{bmatrix} + \frac{a_p^T(k)e_p(k)}{F(k)} a_p(k) \quad (48)$$

Step S8: The pre-filter conductor coefficient vector $f_{p-1}(k)$ is calculated by the following equation:

$$\begin{bmatrix} f_{p-1}(k) \\ 0 \end{bmatrix} = g_p(k) - \frac{b_p^T(k)e_p(k)}{B(k-1)} b_p(k) \quad (49)$$

Step S9: The smoothing coefficient vectors $s_{p-1}(k)$ and $s_p(k)$ are calculated by the following equation:

$$\begin{bmatrix} s_{p-1}(k) \\ s_p(k) \end{bmatrix} = \begin{bmatrix} 0 \\ s_{p-1}(k-1) \end{bmatrix} + \alpha g_p(k) \quad (50)$$

Step S10: The approximate value $z_m(k)$ of the combined estimated echo path vector $\hat{h}_m(k) = [\hat{h}_{1m}^T(k), \hat{h}_{2m}^T(k), \ldots, \hat{h}_{Nm}^T(k)]^T$ is updated by the following equation:

$$z_m(k+1) = z_m(k) + s_p(k)x(k-p+1) \quad (51)$$

Step S11: Upon each increment of time k, Steps S2 through S10 are repeated.

Figure 1:
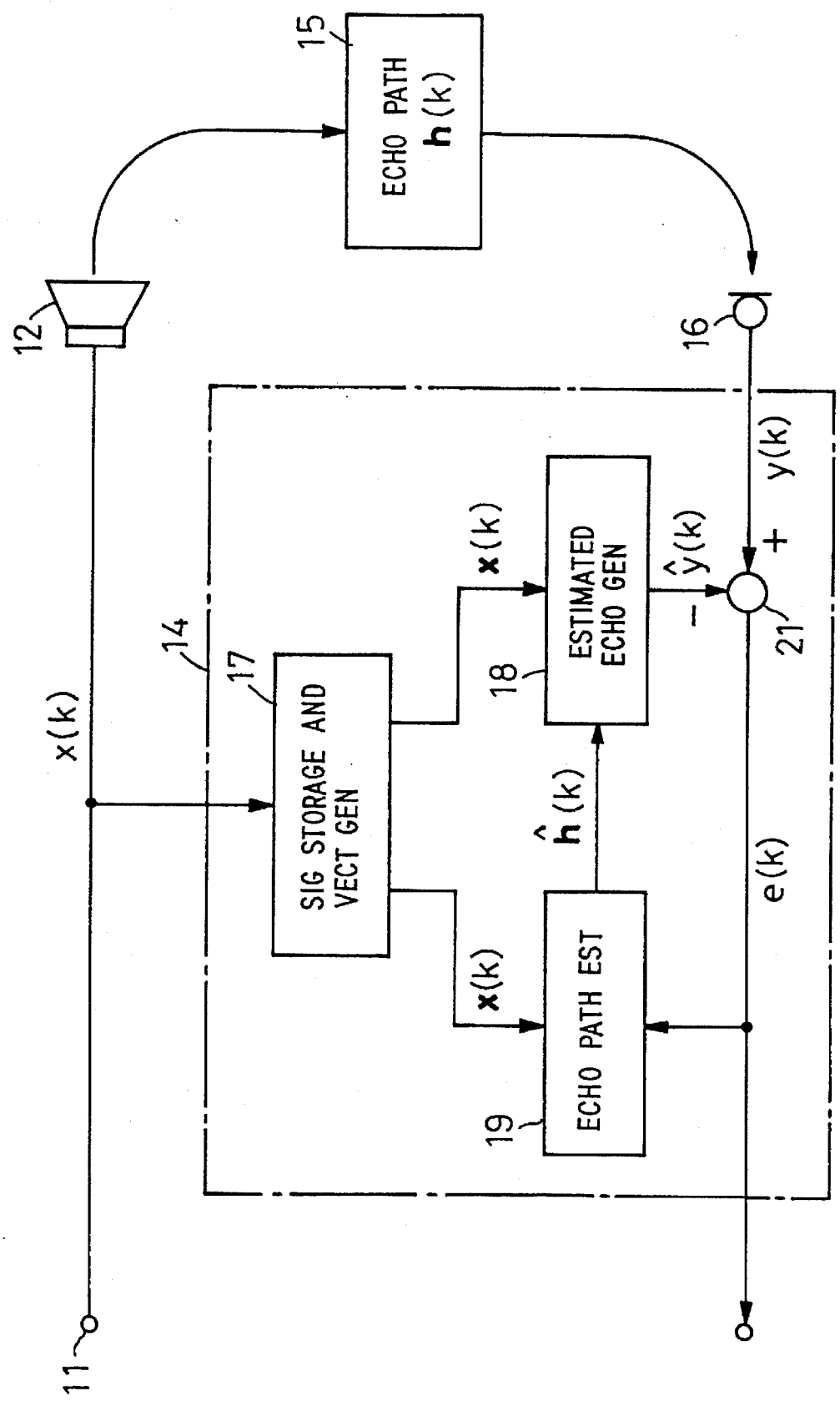
FIG. 1 is a block diagram showing a one-channel echo canceller.
Figure 2:
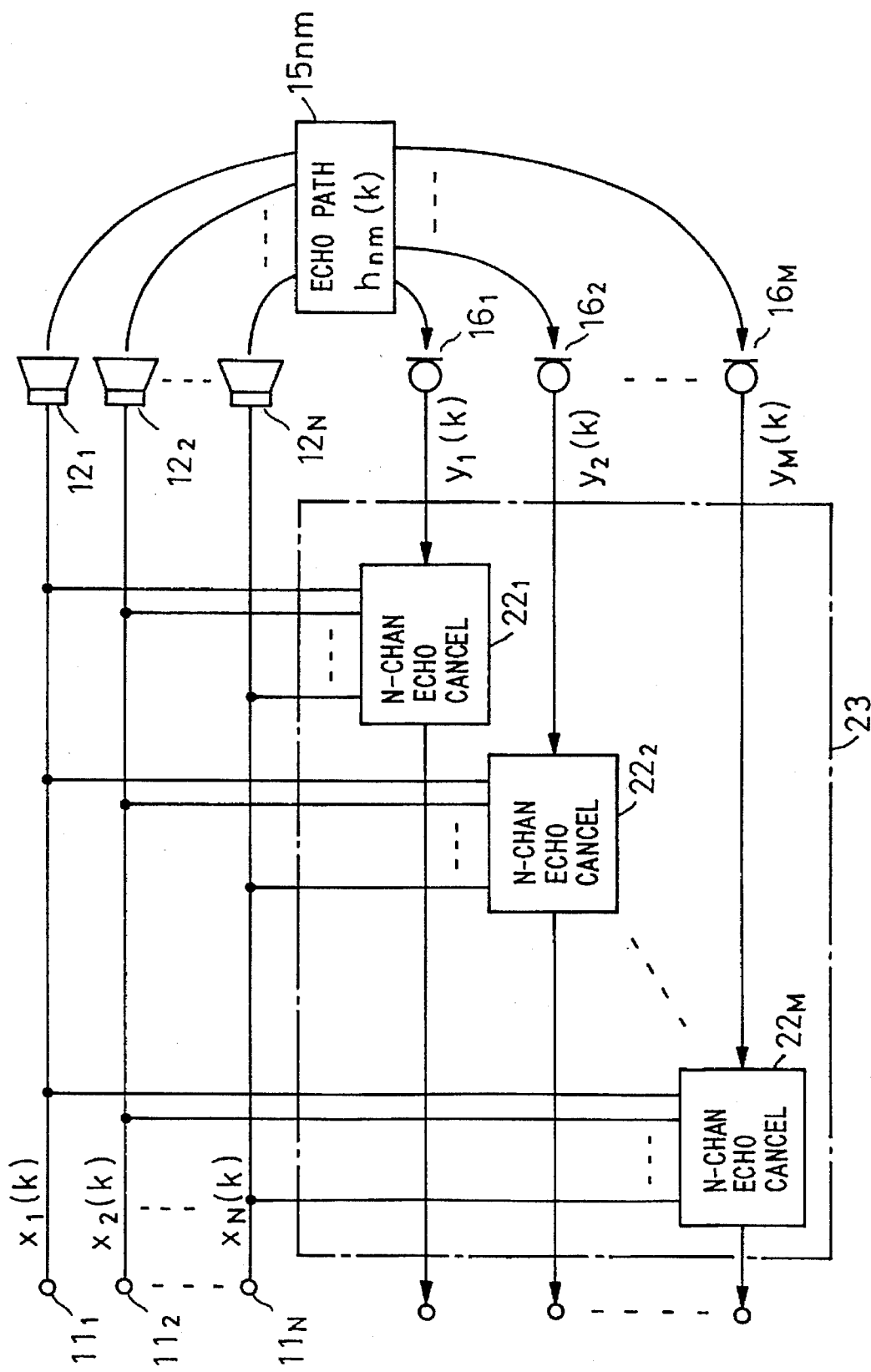
FIG. 2 is a block diagram showing a multi-channel echo canceller system.
Figure 3:
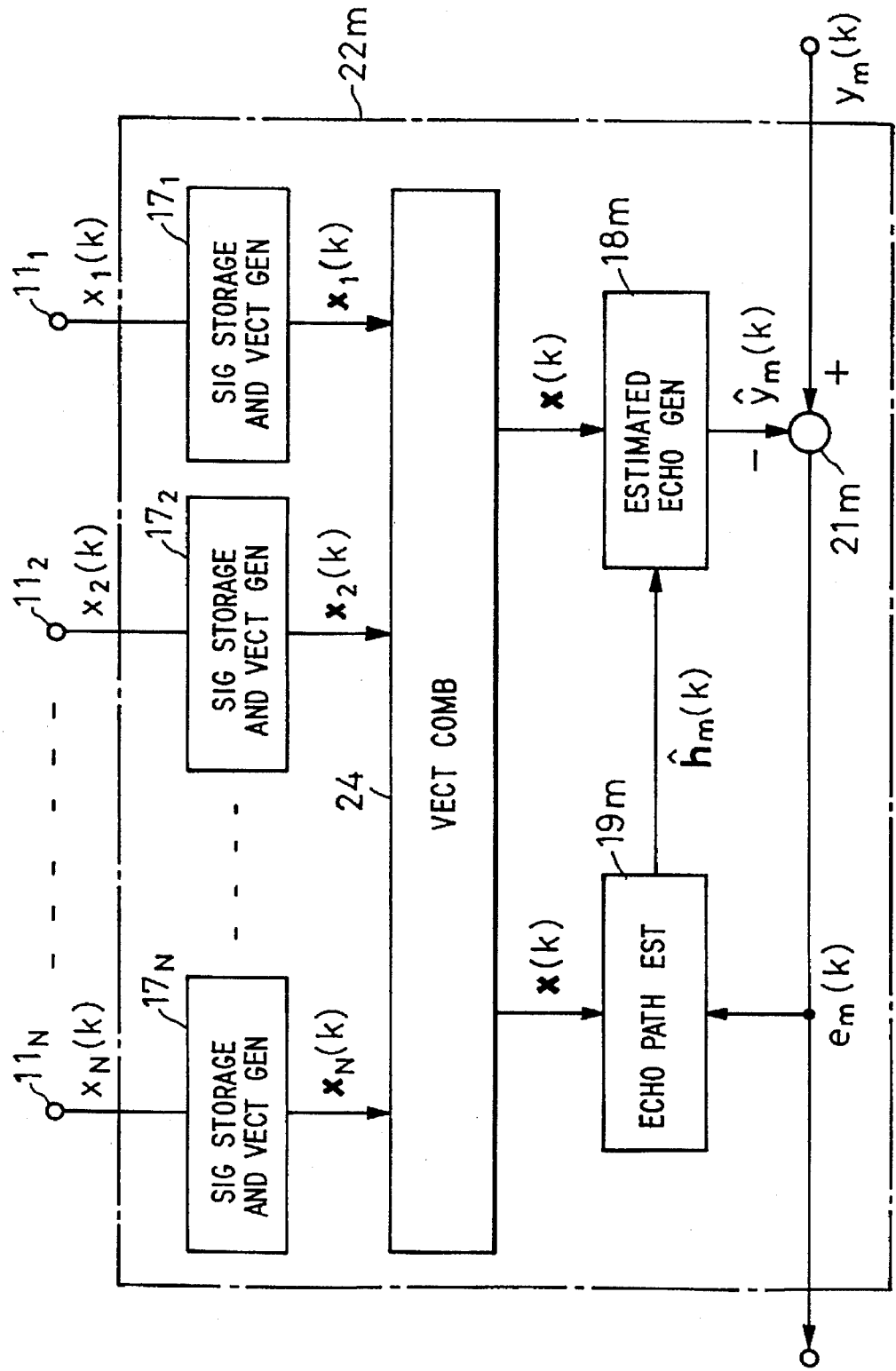
FIG. 3 is a block diagram showing a conventional multi-channel echo canceller.
Figure 6:
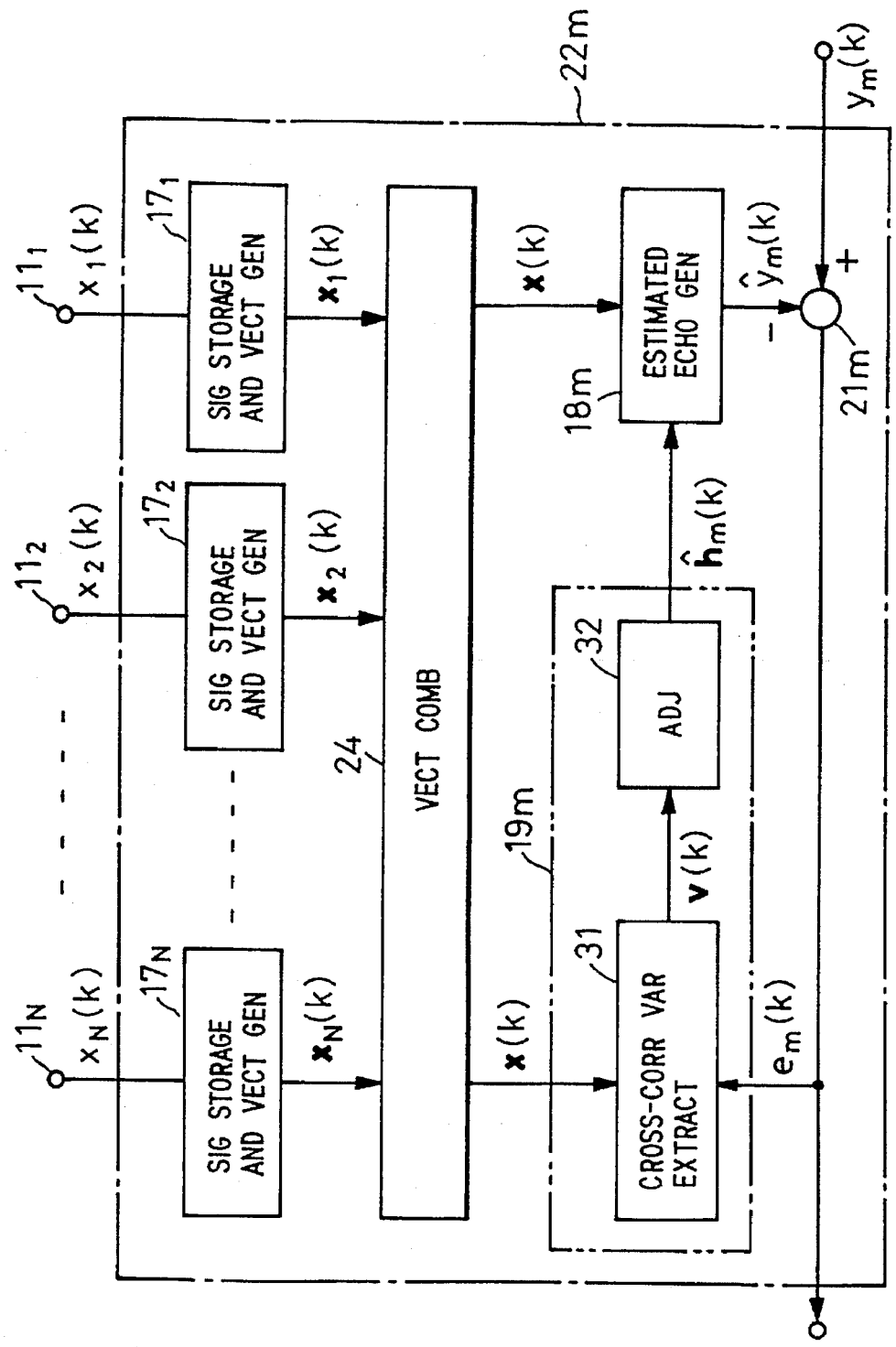
FIG. 6 is a block diagram illustrating the construction of a multi-channel echo canceller embodying the first-mentioned method of the present invention.

FIG. 6 illustrates in block form an embodiment of the first method of the present invention applied to the echo canceller $22_m$ in FIG. 3 which is used in the FIG. 2 teleconferencing system provided with the N-channel loudspeaker system and the M-channel microphone system. The parts corresponding to those in FIG. 3 are identified by the same reference numerals. According to the present invention, a cross-correlation variation extracting part 31 is provided in each of the echo cancellers $22_1$ to $22_M$ in FIG. 2. The received signal $x(k)$ and the residual echo $e_m(k)$ in each channel are inputted into the cross-correlation variation extracting part 31, wherein the adjustment vector $v(k)$ is generated.

In this embodiment, the auto-correlation of the combined received signal vector $x(k)$ is removed using the projection algorithm, by which the variation in the cross-correlation between received signals is extracted to generate the adjustment vector $v(k)$. That is to say, the cross-correlation variation extracting part 31 stores information about the combined received signal vector $x(k)$ and the residual echo $e_m(k)$ defined by Eq. (8), then solves the following equation (52) corresponding to Eq. (27) to obtain $g_p(k)$ and generates, by Eq. (28), a decorrelated vector, i.e. the adjustment vector $v(k)$.

$$[X^T(k)X(k)g_p(k) = e_m(k) \quad (52)$$

An adjusting part 32 updates the current combined estimated echo path vector $\hat{h}_m(k)$ by calculating $\hat{h}_m(k+1)$ on the basis of Eqs. (21) and (28) using the adjusting vector $v(k)$ as follows:

$$\hat{h}_m(k+1) = \hat{h}_m(k) + \alpha v(k) \quad (53)$$

The combined estimated echo path vector $\hat{h}_m(k)$ thus updated is fed to the estimated echo generating part $18_m$.

In this way, the variation in the cross-correlation between multi-channel received signal vectors is extracted in the cross-correlation variation extracting part 31 and new multi-channel signal vectors are generated in which the variation in the cross-correlation between the respective received signal vectors are emphasized. Since such a multi-channel signal vector is fed to the adjusting part 32, it is possible to speed up the estimation of the true echo paths.

Figure 7:
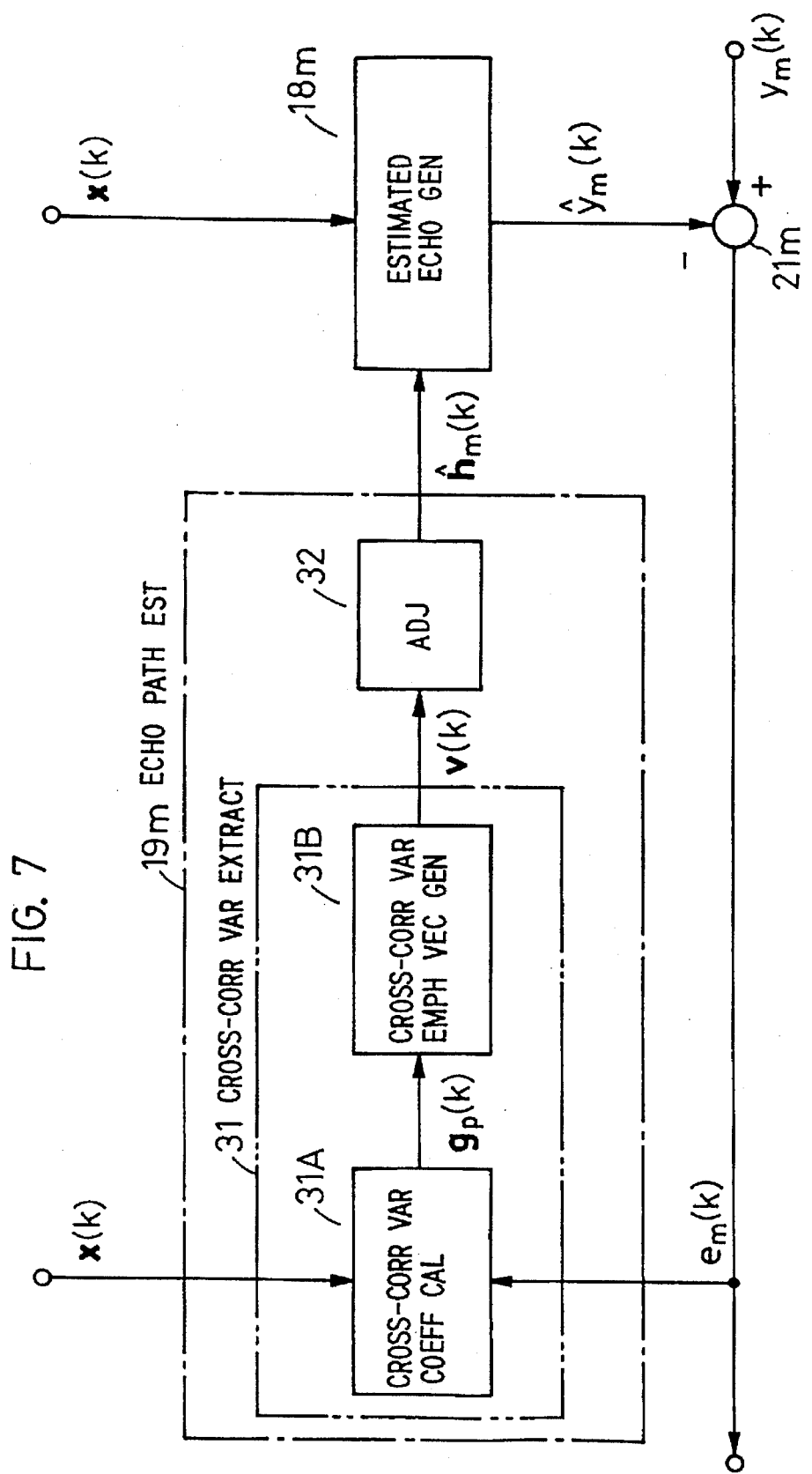
FIG. 7 is a block diagram illustrating the construction of a cross-correlation variation extracting part 31 in FIG. 6.
Figure 8:
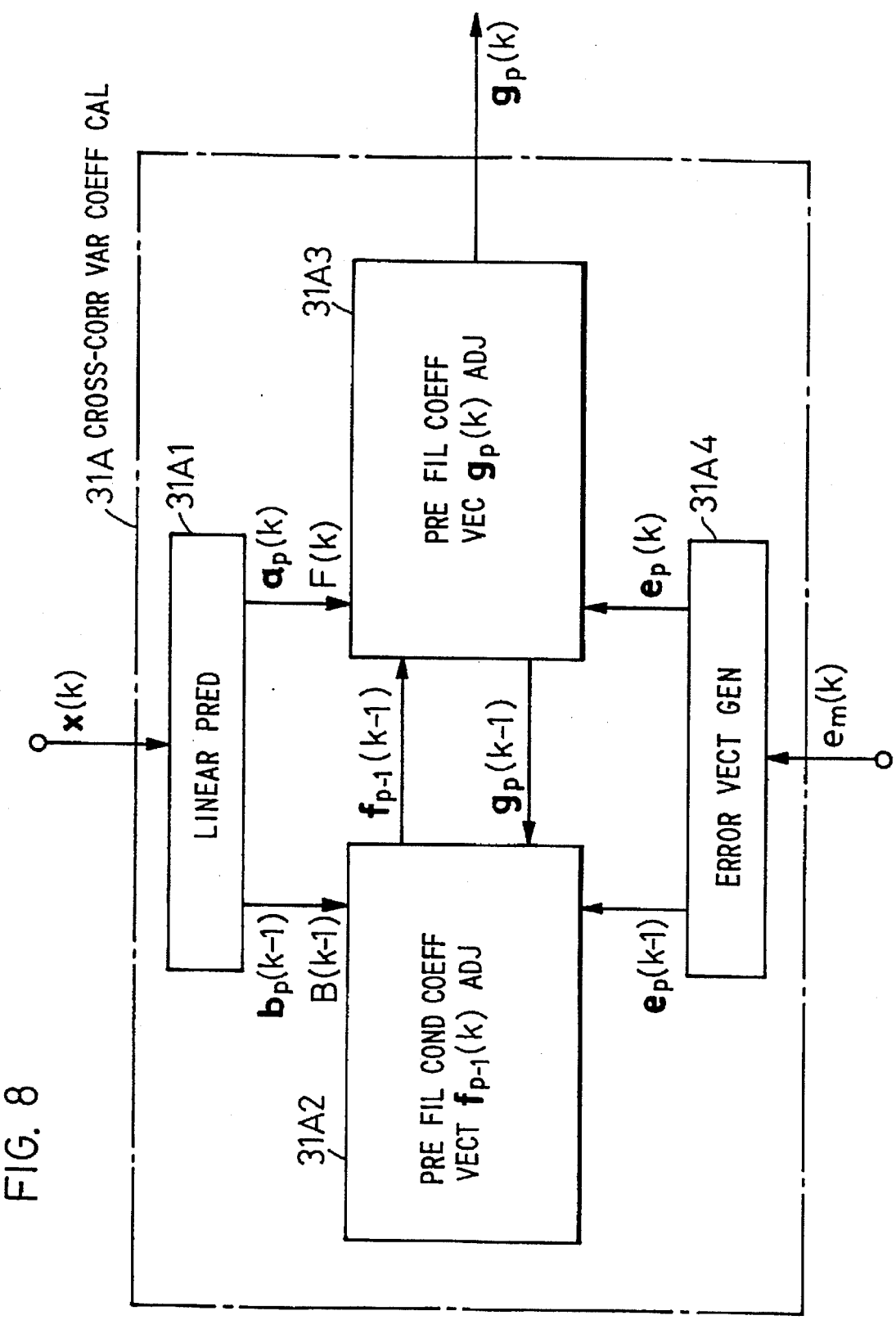
FIG. 8 is a block diagram illustrating an example of the construction of a cross-correlation variation coefficient calculating part 31A in FIG. 7.

FIG. 7 is a block diagram showing a modified form of the cross-correlation variation extracting part, which is formed by a cross-correlation variation coefficient calculating part 31A and a cross-correlation variation emphasized vector generating part 31B and in which the former solves Eq. (27) to obtain the pre-filter coefficient vector $g_p$ expressed by Eq. (30) and the latter calculates the adjustment vector $v(k)$ by Eq. (28). In this case, the cross-correlation variation coefficient calculating part 31A can reduce the amount of calculation of the pre-filter coefficient vector $g_p(k)$ through utilization of linear prediction. That is to say, as shown in FIG. 8, the cross-correlation variation coefficient calculating part 31A is formed by a linear prediction part 31A1, a pre-filter conductor coefficient vector adjusting part 31A2, a pre-filter coefficient vector adjusting part 31A3 and an error signal vector generating part 31A4. The linear prediction part 31A1 calculates the forward linear prediction coefficient vector $a_p(k)$ of the combined input signal vector $x(k)$, the minimum value of the sum of forward a posteriori prediction-error squares $F(k)$, the backward linear prediction coefficient vector $b_p(k)$ of the combined input signal vector $x(k)$ and the minimum value of the sum of backward a posteriori prediction-error squares $B(k)$.

On the other hand, the error signal vector generating part 31A4 holds the p latest error signals (residual echoes) $e_m(k)$, $e_m(k-1), \ldots, e_m(k-p+1)$ and iteratively generates the error signal vector $e_p(k)$ of Eq. (44) by Eq. (45). The pre-filter conductor coefficient vector adjusting part 31A2 calculates the pre-filter conductor coefficient vector $f_{p-1}(k-1)$ by Eq. (32) and the filter coefficient vector adjusting part 31A3 the pre-filter coefficient vector $g_p(k)$ by Eq. (31). The pre-filter coefficient vector $g_p(k)$ thus obtained is provided to the cross-correlation variation emphasized vector generating part 31B.

Figure 9:
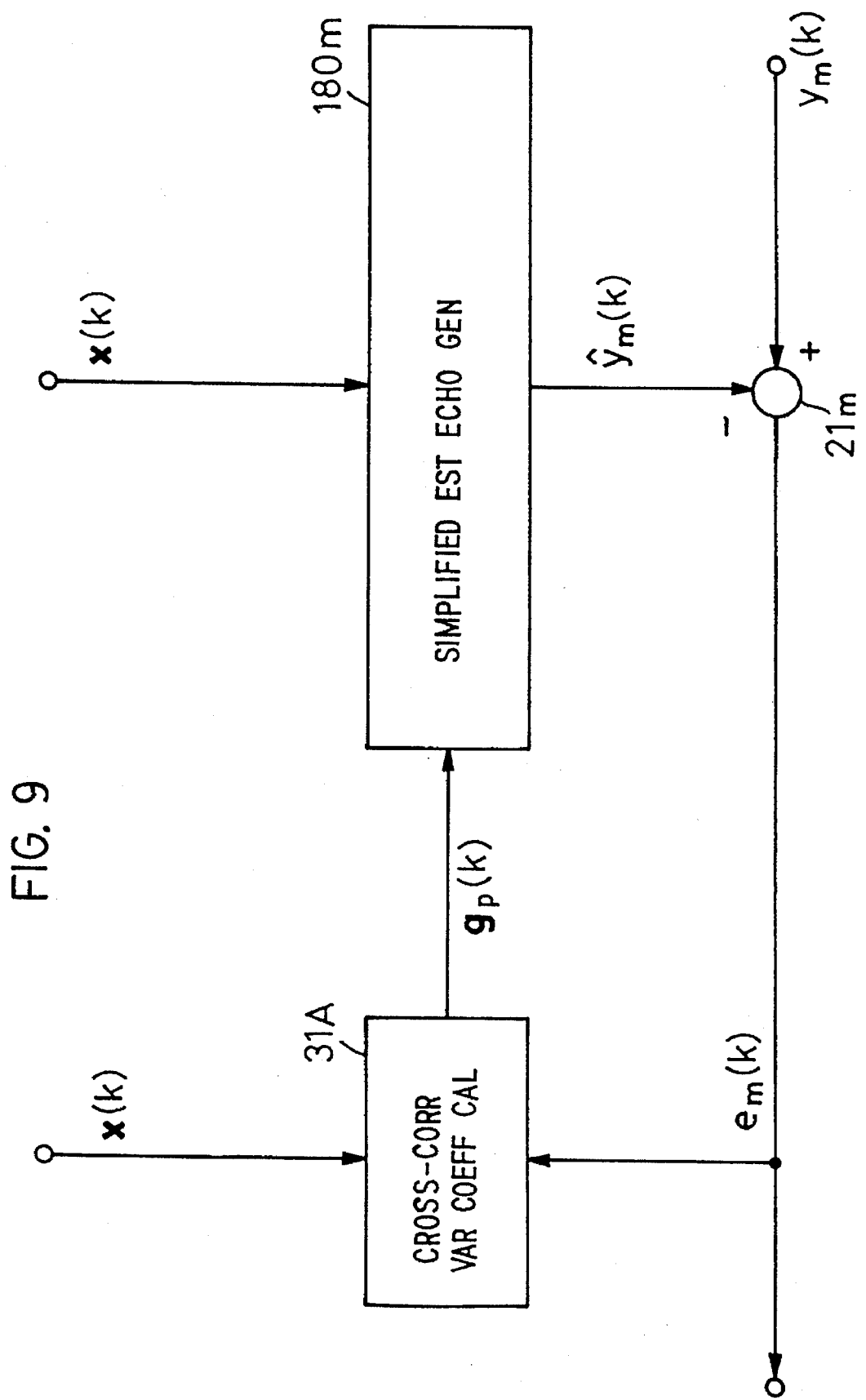
FIG. 9 is a block diagram illustrating an embodiment in which a cross-correlation variation emphasis vector generating part 31B, an adjusting part 32 and an estimated echo generating part 18m in FIG. 7 are formed by a simplified estimated echo generating part 180m using an approximate echo path vector.
Figure 10:
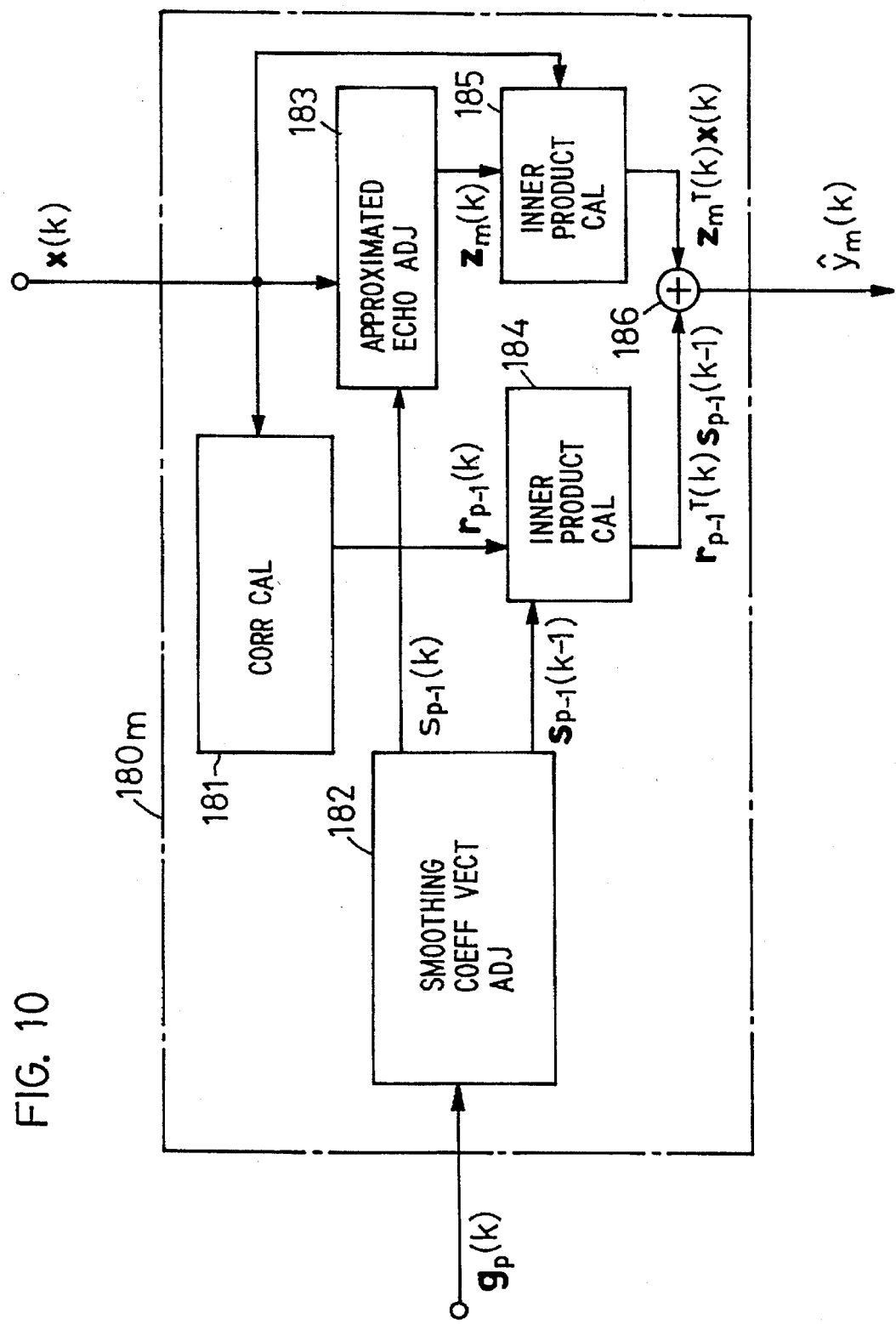
FIG. 10 is a block diagram illustrating the construction of the simplified estimated echo generating part 180m in FIG. 9.

FIG. 9 illustrates a configuration which reduces the amount of calculation in the FIG. 6 embodiment by generating the estimated echo $\hat{y}_m(k)$, instead of calculating the combined estimated echo path vector $\hat{h}_m(k)$, by using the approximate vector $z_m(k)$ of the vector $\hat{h}_m(k)$ on the basis of the fast projection algorithm described previously in Steps S1 through S11. In this instance, the echo path estimating part $19_m$ and the estimated echo generating part $18_m$ in FIG. 6 are replaced by the cross-correlation variation coefficient calculating part 31A and the simplified estimated echo generating part $180_m$; the former is identical with that shown in FIG. 7 or 8 and the latter corresponds to the set of the cross-correlation variation emphasized vector generating part 31B, the adjusting part 32 and the estimated echo generating part $18_m$ and, as depicted in FIG. 10, it comprises a correlation calculating part 181, a smoothing coefficient vector adjusting part 182, an approximated echo path adjusting part 183, inner product calculating parts 184 and 185 and an adder 186.

The correlation calculating part 181 calculates the combined input signal vector $x(k)$ and the auto-correlation vector $r_{p-1}(k)$ of $x(k)$ by Eqs. (40) and (41). The smoothing coefficient vector adjusting part 182 calculates by Eq. (50) smoothing coefficient vector $s_{p-1}(k-1)$ and $s_p(k)$ from the pre-filter coefficient vector $g_p(k)$. The approximated echo path adjusting part 183 calculates by Eq. (51) the approximated echo path vector $z_m(k)$ from $s_p(k)$ and $x(k)$. The inner product calculating part 184 calculates the inner product $r_{p-1}^T(k)s_{p-1}(k-1)$ of the smoothing coefficient vector $s_{p-1}(k-1)$ and the correlation vector $r_{p-1}(k)$. The inner product calculating part 185 calculates the inner product $z_m^T(k)x(k)$ of the input signal vector $x(k)$ and the approximated echo path vector $z_m(k)$. These inner products are added together by the adder 186 to obtain the estimated echo signal $\hat{y}_m(k)$.

Next, the third method of the present invention will be described concretely. According to this method, a function of actively changing the cross-correlation between received signals of respective channels are adopted, and the received signals added with the variation in the correlation between them are radiated by loudspeakers and used to derive the adjusted vector of the estimated echo.

The variation in the correlation between received signals of respective channels can be added thereto by (a) filter processing, (b) signal multiplication processing, (c) signal addition processing and (d) pitch shift processing. These methods will hereinafter be described one after another.

(a) Method by Filter Processing

The received signals $x_1(k), x_2(k), \ldots, x_N(k)$ of respective channels are inputted to time-variant filters with different time-variant characteristic, wherein they are convoluted (indicated by *) with impulse response $q_1(k), q_2(k), \ldots, q_N(k)$ of the filters for conversion into signals $\bar{x}_1(k), \bar{x}_2(k), \ldots, \bar{x}_N(k)$ which are expressed as follows:

$$\begin{aligned}\bar{x}_1(k) &= q_1(k)*x_1(k)\\ \bar{x}_2(k) &= q_2(k)*x_2(k)\\ &\vdots\\ \bar{x}_N(k) &= q_N(k)*x_N(k)\end{aligned} \quad (54)$$

By this, the variation in the cross-correlation between the received signal of respective channels can be added thereto.

(b) Method by Signal Multiplication

The received signals $x_1(k), x_2(k), \ldots, x_N(k)$ of respective channels are multiplied by different functions $u_1(k), u_2(k), \ldots, u_N(k)$ for conversion into signals $\bar{x}_1(k), \bar{x}_2(k), \ldots \bar{x}_N(k)$ which are expressed as follows:

$$\begin{aligned}\bar{x}_1(k) &= u_1(k) \cdot x_1(k)\\ \bar{x}_2(k) &= u_2(k) \cdot x_2(k)\\ &\vdots\\ \bar{x}_N(k) &= u_N(k) \cdot x_N(k)\end{aligned} \quad (55)$$

By this, the variation in the cross-correlation between the received signals can be added thereto.

(c) Method by Signal Addition

The received signals $x_1(k), x_2(k), \ldots, x_N(k)$ of respective channels are added to different functions $n_1(k), n_2(k), n_N(k)$, respectively, for conversion into signals $\bar{x}_1(k), \bar{x}_2(k), \ldots, \bar{x}_N(k)$ which are expressed as follows:

$$\begin{aligned}\bar{x}_1(k) &= x_1(k) + n_1(k)\\ \bar{x}_2(k) &= x_2(k) + n_2(k)\\ &\vdots\\ \bar{x}_N(k) &= x_N(k) + n_N(k)\end{aligned} \quad (56)$$

By this, the variation in the cross-correlation between received signals of respective channels can be added thereto.

(d) Method by Pitch Shift Processing

The frequency characteristics of the received signals $x_1(k), x_2(k), \ldots, x_N(k)$ of respective channels are each subjected to different time-variant frequency axis expansion or compression, that is, by pitch shift processing, by which the signals are converted into $\bar{x}_1(k), \bar{x}_2(k), \ldots, \bar{x}_N(k)$ signals. By this, the variation in the cross-correlation between the received signals of the respective channels can be added thereto.

Figure 11:
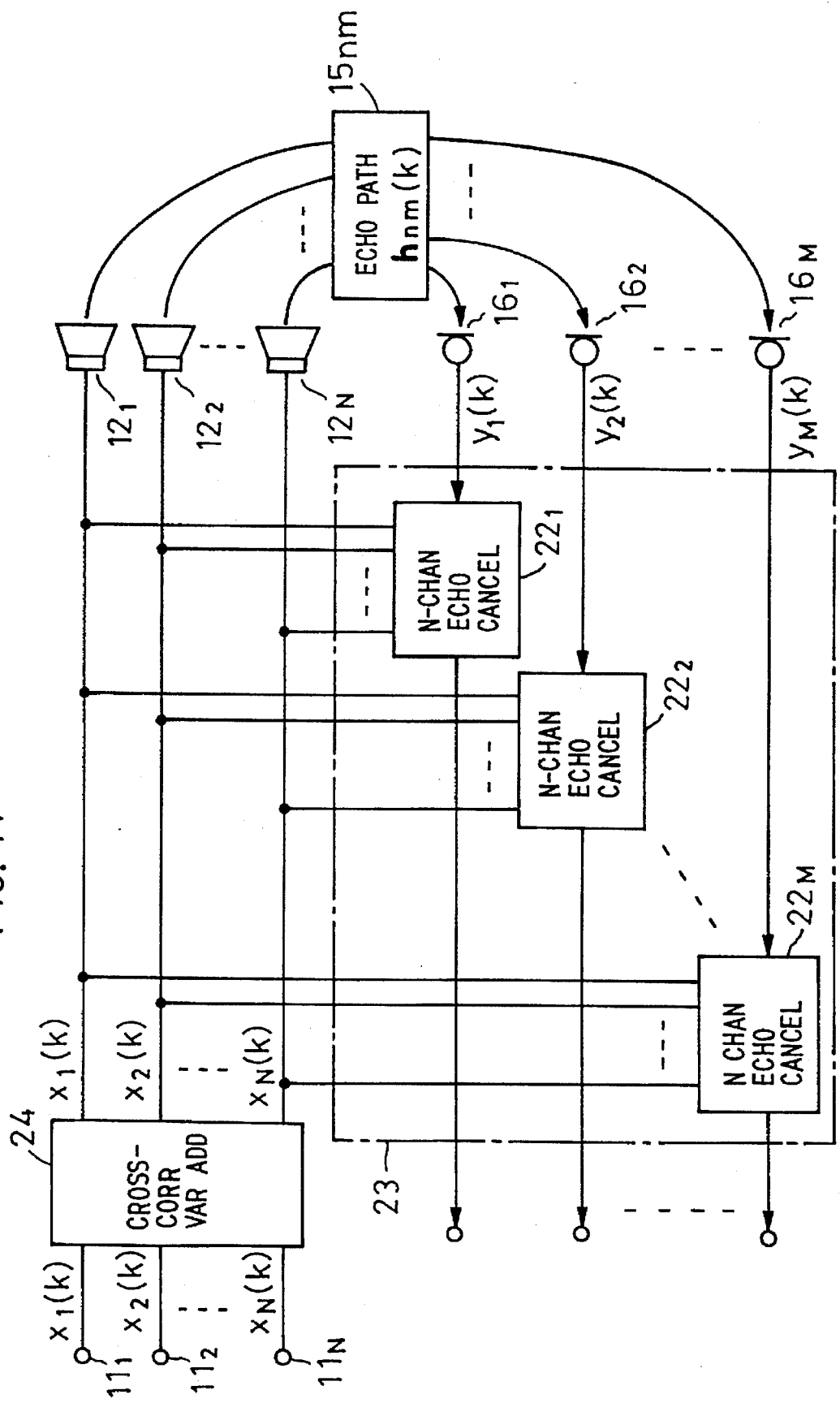
FIG. 11 is a block diagram illustrating the configuration of a multi-channel echo canceller embodying the third-mentioned method of the present invention.

FIG. 11 illustrates an embodiment of the third method of the present invention. The parts corresponding to those in FIG. 2 are identified by the same reference numerals. In this embodiment, a cross-correlation variation adding part 24 is provided at the received signal input side. In the cross-correlation variation adding part 24, the received signals $x_1(k), x_2(k), \ldots, x_N(k)$ of the respective channels are converted into $\bar{x}_1(k), \bar{x}_2(k), \ldots, \bar{x}_N(k)$ by being actively added with the variation in their cross-correlation. These signals $\bar{x}_1(k), \bar{x}_2(k), \ldots, \bar{x}_N(k)$ thus converted are radiated from the speakers $12_1, 12_2, \ldots, 12_N$, while at the same time they are inputted into the echo canceller system 23.

In the implementation of the cross-correlation variation adding part 24, care should be taken not to impair the psycho-acoustic quality of the converted signals $\bar{x}_1(k), \bar{x}_2(k), \ldots, \bar{x}_N(k)$ when they are reconstructed as acoustic signals. Next, a description will be given of concrete examples of the above-mentioned methods in the implementation of the cross-correlation variation adding part 24.

(a) Concrete Example of Implementation by Filter Processing

A description will be given of the time-variant filters for converting the received signal $x_1(k), \bar{x}_2(k), \ldots, \bar{x}_N(k)$ of the respective channels into those $\bar{x}_1(k), x_2(k), \ldots, x_N(k)$ which satisfy Eq. (54), through utilization of the impulse response $q_1(k), q_2(k), \ldots, q_N(k)$ of the filters having different time-variant characteristics. It is said that amplitude information is mainly important for the psycho-acoustic perception and that phase information is not so important. Hence, it is considered that the psycho-acoustic influence of filter processing would be lessened by implementing the time-variant filter so that the amplitude characteristic remains flat with respect to the frequency of each input signal.

A filter that serves this purpose is an IIR filter which has an all-pass transfer function. The transfer function $G(z)$ of this filter can be expressed as follows:

$$G(z)=A\{z^{-K}-c_1 z^{-(K-1)}+\ldots+(-1)^{K-1}c_{K-1}z^{-1}+(-1)^K c_K\}+\{1-c_1 z^{-1}+\ldots+(-1)^{K-1}c_{k-1}z^{-1}(K-1)+(-1)^K c_k z^{-K}\} \quad (57)$$

where K is the order. Let the sampling interval and the angular frequency be represented by T and $\omega$, respectively. No matter what values the filter coefficients $c_1, c_2, \ldots, c_M$ are set to take, the denominator and the numerator cancel with each other and the amplitude characteristic equation $|G(e^{j\omega T})|$ takes a fixed gain A independent of the angular frequency $\omega$. On the other hand, the phase characteristic differs with the filter coefficients $c_1, c_2, \ldots, c_M$. When the coefficients $c_1, c_2, \ldots, c_M$ are varied with time, a time-variant phase characteristic is provided, but the influence on the amplitude characteristic is very slight.

Now, a description will be given of a secondary all-pass filter which is simple-structured and easy to implement. The configuration of the secondary all-pass filter is described in detail in, for example, Alan V. Oppenheim and Ronald W. Schafer, "DISCRETE-TIME SIGNAL PROCESSING," PRENTICE HALL. For brevity, setting the gain A=1 in Eq. (57), the secondary all-pass transfer function G(z) is given as follows:

$$G(z)=(z^{-2}-c_1 z^{-1}+c_2)/(1-c_1 z^{-1}+c_2 z^{-2}) \quad (58)$$

Figure 12:
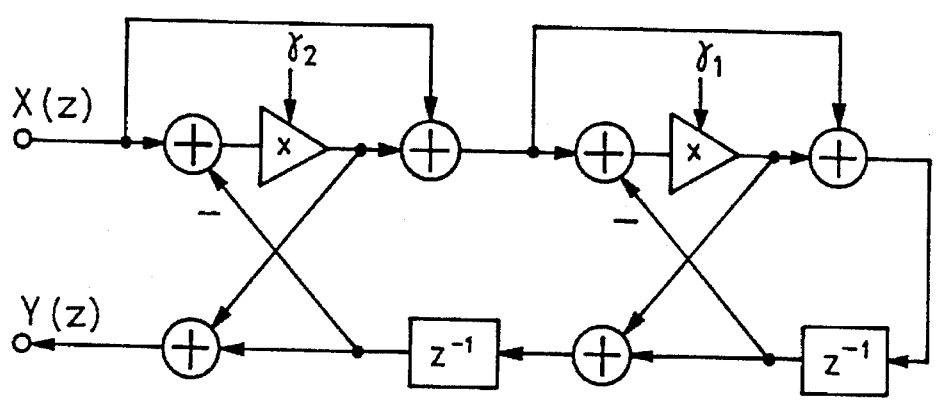
FIG. 12 is a block diagram illustrating an example of a digital filter for implementing the third-mentioned method of the present invention.

When configured as a lattice model, the filter having this transfer function can be formed by six adders, two multipliers and two unit delays as shown in FIG. 12. Replacing the coefficients in Eq. (58) by $$c_1 = -\gamma_1(1+\gamma_2) \quad (59)$$

$$c_2 = \gamma_2 \quad (60)$$

the transfer function of Eq. (58) is expressed by the following equation (61) and the response signal to the input signal $X(z)$ is $Y(z)=X(z)G(z)$.

$$G(z) = \{z^{-2} + \gamma_1(1+\gamma_2)z^{-1} + \gamma_2\}/\{1+\gamma_1(1+\gamma_2)z^{-1}+\gamma_2 z^{-2}\} \quad (61)$$

An advantage of the lattice-type filter configuration in the present invention is the $\gamma_1$ and $\gamma_2$ can be handled as parameters of independent meanings. When the group delay characteristic of the transfer function $G(z)$ of Eq. (61) has a peak, the peak frequency depends virtually only on $\gamma_1$ and the steepness of the peak depends virtually only on $\gamma_2$. That is to say, there is no need of varying all of the filter coefficients with time; for instance, only by causing $\gamma_1$ corresponding to the peak frequency of the group delay characteristic to undergo a different variation for each channel, effective time-variant characteristics can be obtained and the filter configuration can be simplified. By making these time-variant characteristics differ with the channels, it is possible to produce the effect of varying the cross-correlation between the original multi-channel received signals.

(b) Concrete Example of Implementation by Signal Multiplication Processing

A description will be given of functions $u_1(k), u_2(k), \ldots, u_N(k)$ by which the received signals $x_1(k), x_2(k), \ldots, x_N(k)$ of the respective channels are multiplied for conversion into signals $\bar{x}_1(k), \bar{x}_2(k), \ldots, \bar{x}_N(k)$ which satisfy Eq. (55).

If the functions $u_1(k), u_2(K), \ldots, u_N(k)$ take both positive and negative values in Eq. (55), it is considered that the quality of the received signals would seriously be degraded regardless of the magnitude of the variation in the functions. Hence, it is desirable that the functions $u_1(k), u_2(k), \ldots, u_N(k)$ always take positive or negative values and that their variations be also limited. Now, consider the case where the functions $u_1(k), u_2(k), \ldots, u_N(k)$ are in such forms as mentioned below. Let the functions $u_1(k), u_2(k), \ldots, u_N(k)$ be expressed by the following equation (62) using different functions $\omega_1(k), \omega_2(k), \ldots, \omega_N(k)$ each having the maximum amplitude normalized to 1, scaler values $k_1, k_2, \ldots, k_N$ ($0 \leq \|k_1\|, \|k_2\|, \ldots, \|k_N\| < 1$) and gain coefficients $A_1, A_2, \ldots, A_N$, $$u_1(k) = A_1\{1 + k_1\omega_1(k)\} \quad (62)$$
$$u_2(k) = A_2\{1 + k_2\omega_2(k)\}$$
$$\vdots$$
$$u_N(k) = A_N\{1 + k_N\omega_N(k)\}$$

Since at given time k the following equation holds, the signs of the values $u_1(k), u_2(k), \ldots, u_N(k)$ remain unchanged.

$$-1 < k_1\omega_1(k), k_2\omega_2(k), \ldots, k_N\omega_N(k) < 1$$

From the viewpoint of the psycho-acoustic balance, it is desirable that the values of the gain coefficients $A_1, A_2, \ldots, A_N$ be equal or take values of the same sign; in this instance, the functions $u_1(k), u_2(k), \ldots, u_N(k)$ all take values of the same sign. Furthermore, the amount of distortion of each processed signal can be adjusted by the scalar values $k_1, k_2, \ldots, k_N$.

Moreover, from the viewpoint of a frequency shift, by setting the functions $u_1(k), u_2(k), \ldots, u_N(k)$ as follows:

$$u_1(k) = A_1\cos\{\omega_1(k) \cdot k + \phi_1\} \quad (63)$$
$$u_2(k) = A_2\cos\{\omega_2(k) \cdot k + \phi_2\}$$
$$\vdots$$
$$u_N(k) = A_N\cos\{\omega_N(k) \cdot k + \phi_N\}$$

and by shifting the frequency characteristics of the received signals $x_1(k), x_2(k), \ldots, x_N(k)$ through the use of functions $\omega_1(k), \omega_2(k), \ldots, \omega_N(k)$ which have different time-variant characteristics and vary within certain limited ranges, the variation in the cross-correlation can be added to the original multi-channel received signals.

(c) Concrete Example of Implementation by Signal Addition Processing

A description will be given of function $n_1(k), n_2(k), \ldots, u_N(k)$ to which the received signals $x_1(k), x_2(k), \ldots, x_N(k)$ of the respective channels are added for conversion into signals $\bar{x}_1(k), \bar{x}_2(k), \ldots, \bar{x}_N(k)$ which satisfy Eq. (56).

From the viewpoint of the psycho-acoustic influence, it is desirable that the functions $n_1(k), n_2(k), \ldots, n_N(k)$ be moderately smaller in amplitude value than the received signals $x_1(k), x_2(k), \ldots, x_N(k)$ of the respective channels. In view of this, different functions $n_{r1}(k), n_{r2}(k), \ldots, n_{rN}(k)$, normalized so that the maximum amplitude becomes a rated value $A_r$ of the amplitude of the received signals $x_1(k), x_2(k), \ldots, x_N(k)$ of the respective channels, are multiplied by scalar values $\gamma_1, \gamma_2, \ldots, \gamma_N$, by which the functions $n_1(k), n_2(k), \ldots, n_N(k)$ are expressed as follows:

$$n_1(k) = \lambda_1 n_{r1}(k) \quad (64)$$
$$n_2(k) = \lambda_2 n_{r2}(k)$$
$$\vdots$$
$$n_N(k) = \lambda_N n_{rN}(k)$$

Based on the scalar values $\gamma_1, \gamma_2, \ldots, \gamma_N$, it is possible to determine the degree to which the magnitude of the signal to be added to each of the received signals $x_1(k), x_2(k), \ldots, x_N(k)$ is made smaller than the rated value $A_r$.

(d) Concrete Example of Implementation by Pitch Shift Processing

A description will be given of an embodiment in which the received signals $x_1(k), x_2(k), \ldots, x_N(k)$ of the respective channels are converted into signals $\bar{x}_1(k), \bar{x}_2(k), \ldots, \bar{x}_N(k)$ by subjecting the frequency characteristics of each received signal to different time-variant frequency axis expansion/compression processing or pitch shift processing.

The pitch shift processing involves time expansion/compression as well as frequency axis expansion/compression and can be processed in the time domain. When the time axis is compressed, interpolation processing is needed to make the duration of the processed signal equal to the duration of the original signal, whereas when the time axis is expanded, the duration of the processed signal becomes longer than the duration of the original signal; hence decimation processing is needed. Such interpolation/decimation processing can be implemented by detecting a silent duration and extending or removing it.

As described above, the methods of the present invention can be applied to the cancellation of echoes to implement a teleconference system of highly realistic presence which permits transmission of acoustic spatial information from either point by using a multi-channel transmission system and terminal equipment provided with multi-channel microphone and loudspeaker systems between two points.

Figure 4:
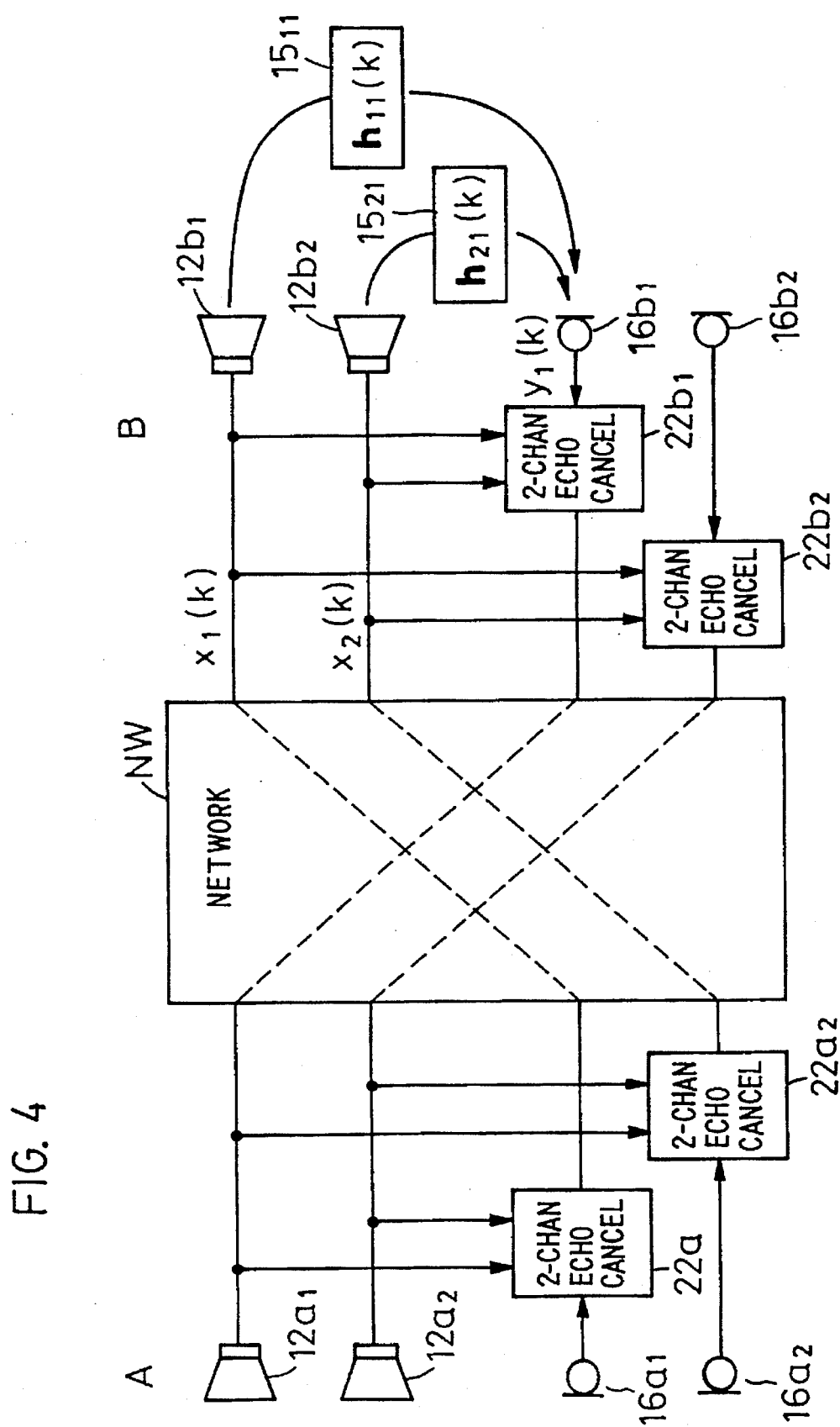
FIG. 4 is a block diagram showing a stereo teleconferencing system.

Now, consider a stereo teleconferencing system which connects two points via a two-channel transmission system and uses two-channel microphone and loudspeaker systems as shown in FIG. 4. For instance, when a plurality of speakers alternately speak in their seats at the point A, the stereo speech signals that are picked up by two microphones bear a cross-correlation therebetween dependent on the positional relationship between the speakers and the microphones. When these speech signals are received at the point B and inputted to the conventional echo canceller, the echo path estimation depends on the cross-correlation and hence is incorrect, with the result that a large echo returns to the point A each time the speaker changes. In contrast to this, when the echo cancellation method of the present invention is used, a variation in the cross-correlation between the stereo received signals by the change of the speaker is extracted and used to correct an error in the echo path estimation; thus, it is possible to suppress the echo from increasing whenever the speaker changes. Furthermore, in the case where speech uttered by one person is picked up by a plurality of microphones, even if the speaker speaks at one place, the cross-correlation between the speech signals picked up by the microphone delicately changes. The method of the present invention permits effective utilization of such a slight variation in the cross-correlation between signals.

Figure 13:
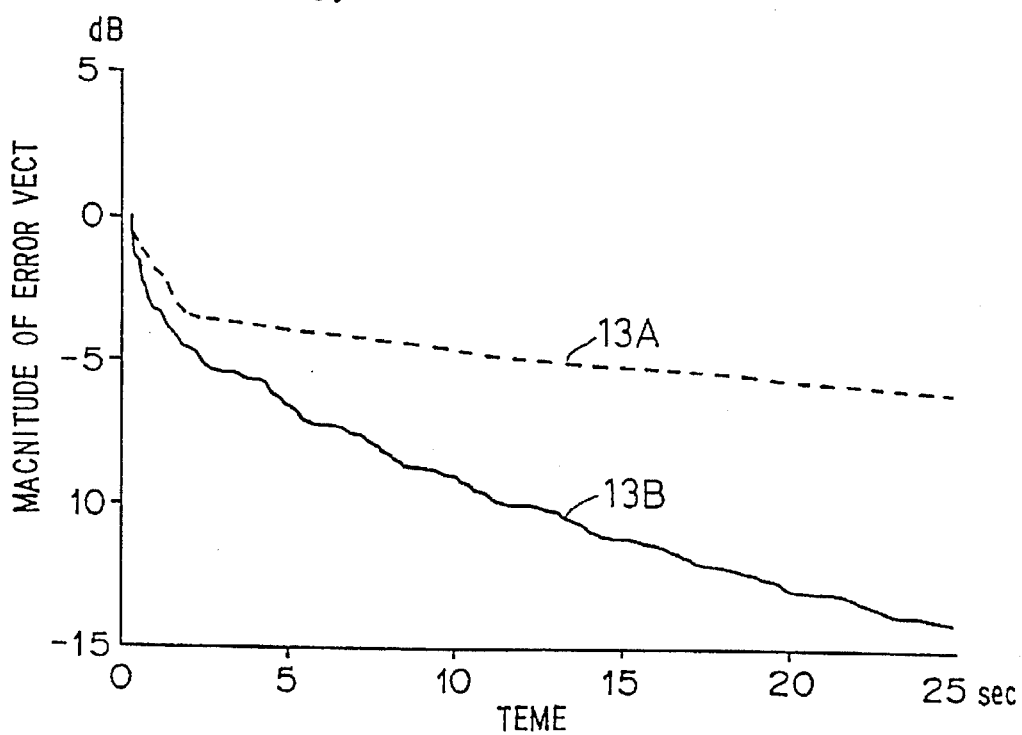
FIG. 13 is a graph showing the convergence of the estimated echo path vector according to the first- or second-mentioned method of the present invention.

FIG. 13 is a graph showing the results of computer simulations using stereophonically picked up speech uttered by a speaker with his body or head fixed; the prior art method and this invention method are compared in terms of the error vector between the combined estimated echo path vector generated in the echo path estimating part and the combined true echo path vector as indicated by the curves 13A and 13B. This invention method used the secondary projection algorithm for the extraction of the variation in the cross-correlation. From FIG. 13 it will be seen that this invention method captures even a delicate variation in the cross-correlation between signals, permitting the correction of an error in the echo path estimation. It can be said that the present invention effectively detects a delicate variation between channels through utilization of past data.

Figure 14:
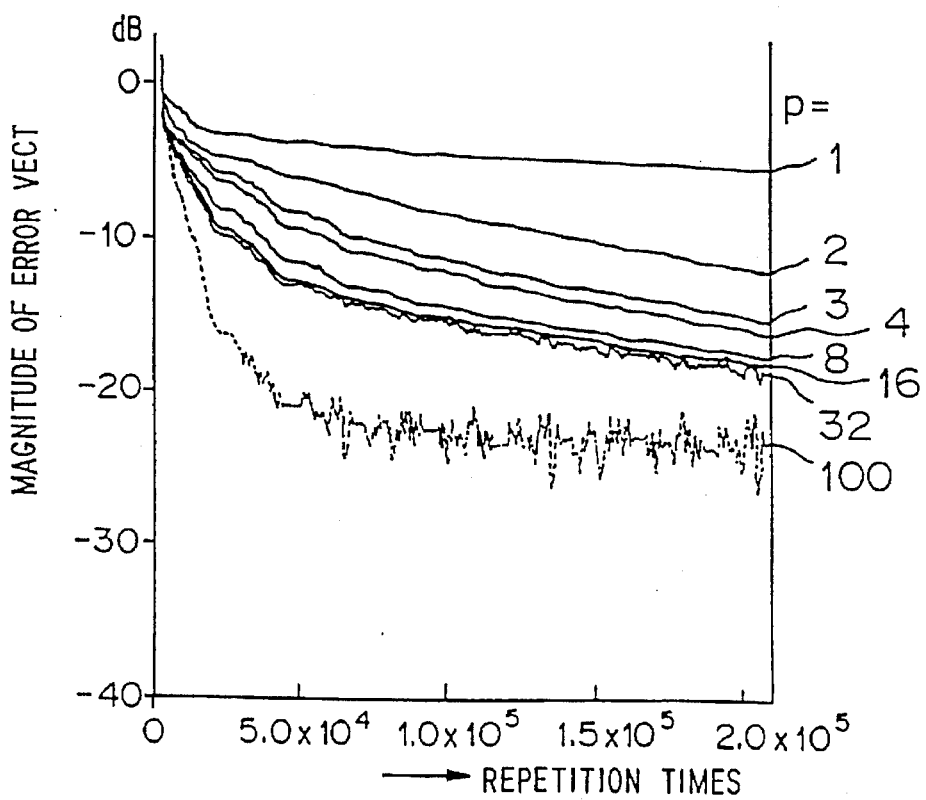
FIG. 14 is a graph showing the convergence characteristic of the estimated echo path vector according to the first- or second-mentioned method of the present invention, with the order p of a projection algorithm used as a parameter.

FIG. 14 is a graph showing the convergence of the estimated echo path vector in the case of stereophonically picked up speech as in the case of FIG. 13, the order p of the projection algorithm being used as a parameter. The number L of taps was set to 500+500 and the step size α was set to 0.5. This graph also indicates that the present invention is effective.

Figure 15:
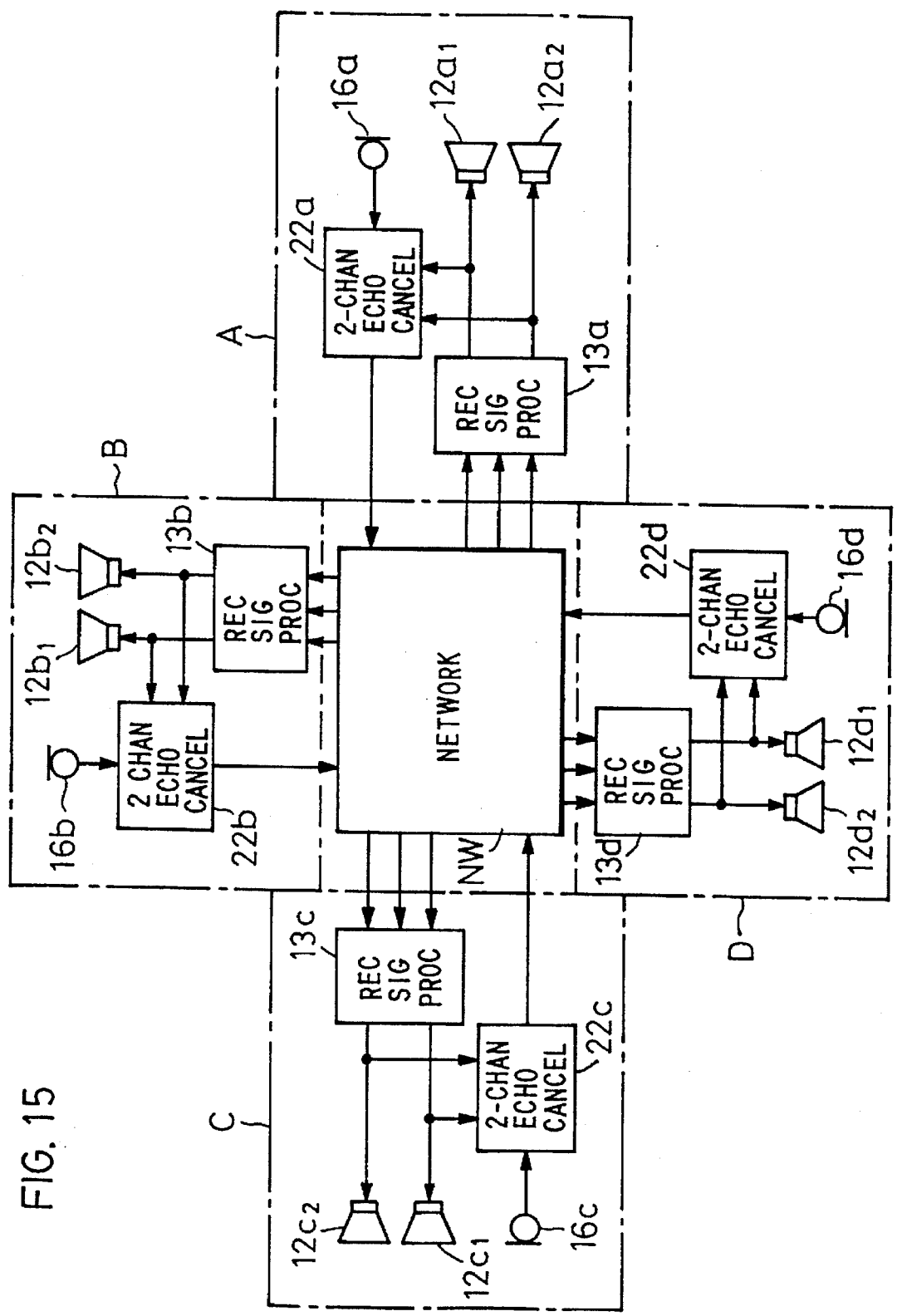
FIG. 15 is a block diagram illustrating a teleconferencing system which provides a sound image localization function in four-point communications.

Other than a method according to which at a terminal provided with a stereo receiving system, two-channel stereo signals picked up at the other side are received and reconstructed intact as shown in FIG. 4, there is proposed a method for multi-point teleconferencing by which the received signal for each point is freely subjected to sound image localization at the receiving side to provide a comfortable receiving environment. The method of the present invention is also applicable to such multi-point teleconferencing terminals. FIG. 15 illustrates the configuration of a teleconferencing system for four points A, B C and D interconnected via a network. At each point, the sending or microphone system is one-channel (monaural). Now, the point D will be described. Let it be assumed that at the point D, received signals from the points A, B and C are subjected to sound image localization in a received signal processing part $13d$ so that the signals are localized at the right, center and left with respect to the point D, respectively, by which new two-channel stereo received signals are generated for stereo reconstruction by loudspeakers $12d_1$ and $12d_2$. Also in this case, if the method of the present invention is used, when the speaker changes to a person at a different point, the echo canceller $22d$ extracts a variation in the cross-correlation between the stereo received signals and corrects the error as in the above-mentioned case; hence, it is possible to suppress the echo from increasing, as compared with the conventional method.

Figure 16:
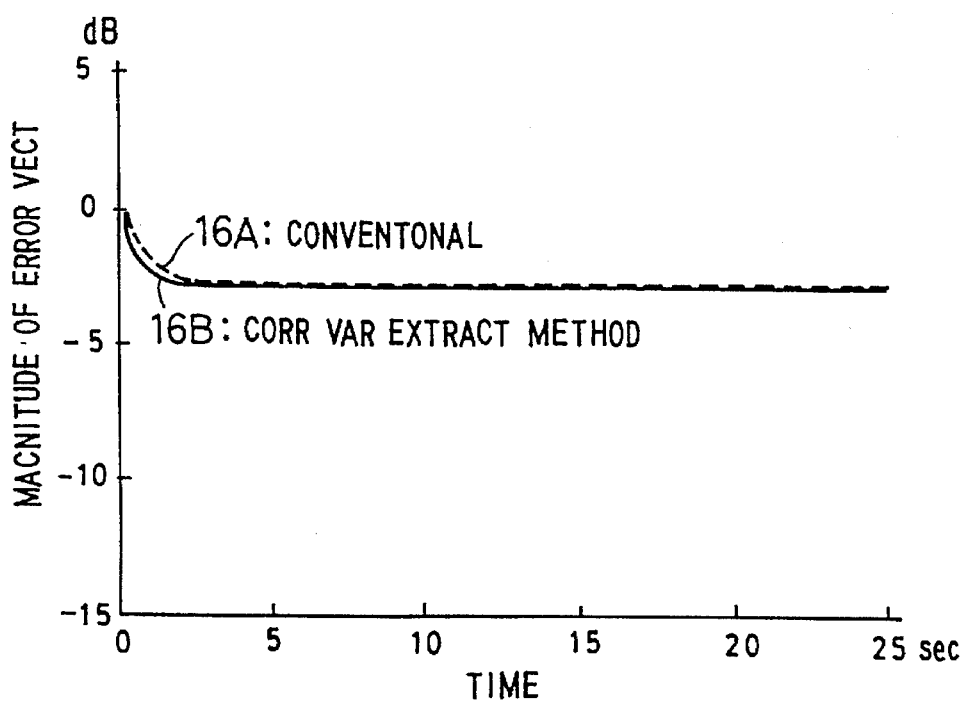
FIG. 16 is a graph showing the comparison between a cross-correlation extracting method and a conventional method in terms of the magnitude of an error vector between a true echo path and estimated one in the case of fixed cross-correlation stereo signals being received.

The curves 16A and 16B in FIG. 16 show the convergence of the error vector in the case of using, as received signals, two-channel signals obtained by picking up speech uttered by one speaker with one microphone and applying the speech through two different time-invariant filters on a computer, that is, in the case where the cross-correlation between the received signal is constant. In this instance, even if the first or second method of the present invention is employed to extract a variation in the cross-correlation between the received signals, since the cross-correlation between the received signals does not vary, echo path estimation is made incorrectly, and hence the effect of echo cancellation is not heightened even compared with that by the conventional method.

Figure 17:
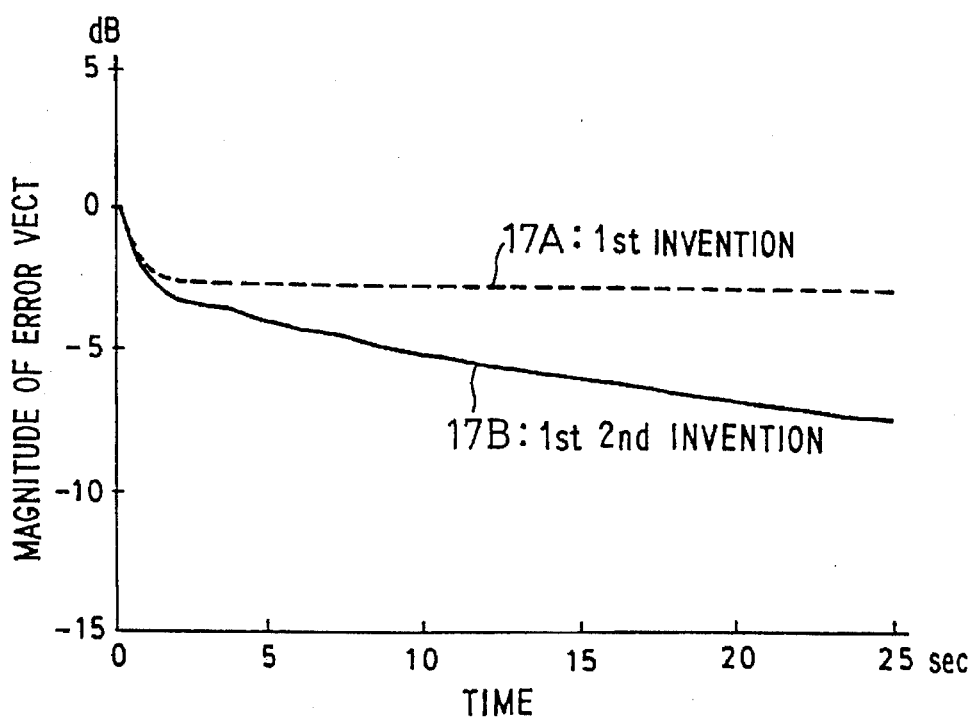
FIG. 17 is a graph comparing error vectors by a correlation variation extracting method embodying the third-mentioned method of the present invention and a conventional extracting method.

By the application of the third method of the present invention, the cross-correlation between the received signals always varies and the echo path estimation is made at all times. The configuration therefor is the same as shown in FIG. 11, and the N-channel echo cancellers $22_1, 22_2, \ldots, 22_M$ are identical in construction with that shown in FIG. 6. The curves 17A and 17B in FIG. 17 indicate the results of computer simulations done on the method of extracting and using the variation in the cross-correlation between received signals in the cases where the same received signals as those used in the case of FIG. 16, that is, stereo signals of a fixed cross-correlation therebetween, were added with and not added with the variation in the cross-correlation, the error vector between the true and estimated echo paths being plotted with the elapse of time. The curve 17A for the case of no variation in the cross-correlation being added is the same as the curve 16B in FIG. 16; in this case, convergence to the true echo path does not take place. On the other hand, in the case where the cross-correlation variation was added, the convergence to the true echo path proceeded and excellent results (the curve 17B) were obtained as is the case with the curve 13B in FIG. 13. The addition of the variation in the cross-correlation to the stereo (two-channel) signals is performed by the signal multiplication processing indicated by Eq. (55), and $u_1(k)$ and $u_2(k)$ are set as follows:

$$u_1(k)=1+0.05\omega(k) \tag{65}$$

$$u_2(k)=1-0.05\omega(k) \tag{66}$$

where $\omega(k)$ is a white noise signal having a maximum amplitude of 1.

That is to say, in the case where the conventional echo cancellation method is applied to a teleconferencing system usually composed of a multi-channel loudspeaker system and one or more microphone channels, when received signals of respective channels have a cross-correlation therebetween, incorrect echo path estimation is made, with the result that the echo increases upon each variation in the cross-correlation between the received signals. The first or second method of the present invention extracts and utilizes the variation in the cross-correlation between received signals to correct an error in the echo path estimation, and hence is effective in settling the above-said problem.

The third method of the present invention has the function of adding a variation to the cross-correlation between received signals, and hence does not completely freeze at a wrong solution in the echo path estimation but continues the echo path estimation in the direction in which to reduce the error; thus, the third method is also effective in solving the problem. With the combined use of the first or second and third methods, the first or second method effectively works when the cross-correlation between received signal varies, and when the cross-correlation does not vary, the third method effectively works to make the correction of the estimated echo path to converge in a short time.

It will be apparent that many modifications and variations may be effected without departing from the scope of the novel concepts of the present invention.

What is claimed is:

1. An N-channel echo cancellation method comprising the steps of:

(a) radiating an input signal $x_n(k)$ of each channel n, (n=1, ... N) as an acoustic signal by a loudspeaker of said each channel, said input signal being inputted as a sample every discrete time k and N being an integer equal to or greater than 2;

(b) picking up, by one microphone, said N acoustic signals propagating thereto over N echo paths from said N loudspeaker to obtain an echo y(k);

(c) obtaining a combined input signal vector $x(k)=[x_1^T(k), x_2^T(k), \ldots, x_N^T(k)]^T$ by combining input signal vectors $x_n(k)$ of said N channels, each composed of an input signal sequences $x_n(k), x_n(k-1), \ldots, x_n(k-L_n+1)$ counted back to time $L_n-1$ from said discrete time k in said each channel n;

(d) generating an estimated echo $\hat{y}(k)$ by inputting said combined input signal vector x(k) into a combined estimated echo path which has a combined estimated impulse response vector $\hat{h}(k)$ obtained by combining estimated impulse response vectors $\hat{h}_n(k)$ (n=1,...,N, of N estimated echo paths corresponding to said N echo paths, each of said N estimated echo paths having $L_n$ taps;

(e) obtaining a residual echo e(k) by subtracting said estimated echo signal $\hat{y}(k)$ from said echo y(k) obtained in said one microphone;

(f) extracting a variation in the cross-correlation between said input signals of said N channels on the basis of said residual echo e(k) and said combined input signal vector x(k);

(g) generating an adjustment vector v(k) on the basis of said cross-correlation variation;

(h) adjusting said combined estimated impulse response vector $\hat{h}(k)$ of said combined estimated echo path by said adjustment vector v(k) to obtain a combined estimated impulse vector $\hat{h}(k+1)$ for use at the next time k+1; and (i) repeating said steps (a) to (h) upon each increment of time k.

2. The method of claim 1, wherein said step (f) is a step of detecting, as coefficients $\beta_1, \ldots, \beta_p$, a variation in the cross-correlation between said input signals by using previous and current ones of said combined input signal vector x(k) and said step (g) is a step of calculating said adjustment vector v(k) by the following equation:

$$v(k)=\beta_1 x(k)+\beta_2 x(k-1)+\ldots+\beta_p x(k-p+1),$$

where p is an integer equal to or greater than 2 but smaller than $L=L_1+L_2+\ldots+L_N$.

3. The method of claim 1, wherein, setting p to an integer equal to or greater than 2 but smaller than $L=L_1+L_2+\ldots+L_N$, letting a matrix $[x(k), x(k-1), \ldots, x(k-p+1)]$ of P combined input signal vectors counted back from said time k be represented by X(k), letting a pre-filter coefficient vector using pre-filter coefficients $\beta_1, \ldots, \beta_p$ as its elements be represented by $g_p(k)=[\beta_1, \ldots, \beta_p]^T$, setting the step size α in the range of 0<α<2 and letting a residual echo vector e(k) be defined by the following equation using p residual echoes counted back from said time k:

$$e(k)=[e(k),(1-\alpha)e(k-1),\ldots,(1-\alpha)^{p-1}e(k-p+1)]^T$$

said step (j) includes a step of calculating said pre-filter coefficient vector $g_p(k)$ by solving the following simultaneous linear equations with p unknowns:

$$[X^T(k)X(k)]g_p(k)=e(k)$$

and calculating said adjustment vector v(k) by the following equation through the use of said pre-filter coefficient vector $g_p(k)$:

$$v(k)=\beta_1 x(k)+\beta_2 x(k-1)+\ldots+\beta_p x(k-p+1),$$

and said step (g) is a step of adjusting said combined estimated impulse response vector $\hat{h}(k)$ by the following equation:

$$\hat{h}(k+1)=\hat{h}(k)+\alpha v(k).$$

4. An N-channel echo cancellation method comprising the steps of:

(a) radiating an input signal $x_n(k)$ of each channel n, (n=1, ... N) as an acoustic signal by a loudspeaker of said each channel, said input signal being inputted as a sample every discrete time k and N being an integer equal to or greater than 2;

(b) picking up, by one microphone, said N acoustic signals propagating thereto over N echo paths from said N loudspeaker to obtain an echo y(k);

(c) obtaining a combined input signal vector $x(k)=[x_1^T(k), x_2^T(k), \ldots, x_N^T(k)]^T$ by combining input signal vectors $x_n(k)$ of said N channels, each composed of an input signal sequences $x_n(k), x_n(k-1), \ldots, x_n(k-L_n+1)$ counted back to time $L_n-1$ from said discrete time k in each channel;

(d) calculating an approximate estimated echo, by a convolution $z^T(k)x(k)$, which is obtained by inputting said combined input signal vector x(k) into a combined approximate estimated echo path which has a approximate estimated impulse response vector $z_n(k)$, n=1,..., N of N estimated echo paths corresponding to said N echo paths, each of said N estimated echo paths having $L_n$ taps;

(e) calculating an auto-correlation vector $r_{p-1}(k)$ of said combined input signal vector x(k);

(f) generating a supplementary estimated echo on the basis of said auto-correlation vector $r_{p-1}(k)$ and a smoothing coefficient vector $s_{p-1}(k-1)$ at time K-1;

(g) calculating the sum of said approximate estimated echo and said supplementary estimated echo and outputting it as a combined estimated echo $\hat{y}(k)$ for said echo y(k);

(h) calculating a residual echo e(k) by subtracting said combined estimated echo $\hat{y}(k)$ from said echo y(k) obtained in said one microphone;

(i) detecting, as pre-filter coefficients $\beta_1, \ldots, \beta_p$, variations in the cross-correlation between said input signals by using current and previous ones of said combined input signal vector x(k) through the use of said residual echo e(k) and said combined input signal vector x(k);

(j) generating a smoothing coefficient vector $s_{p-1}(k)$ by smoothing said pre-filter coefficients $\beta_1, \ldots, \beta_p$;

(k) adjusting said approximate estimated impulse response vector z(k) on the basis of said smoothing coefficient vector $s_{p-1}(k)$ and said previous combined input signal vector x(k-p+1) to obtain an approximate estimated impulse response vector z(k+1) for use at the next time k+1; and (l) repeating said steps (a) to (k) upon each increment of time k.

5. The method of claim 4, wherein:

setting p to an integer equal to or greater than 2 but smaller than $L=L_1+L_2+\ldots,L_N$, said step (e) includes a step of calculating said auto-correlation vector $r_{p-1}(k)$ of said combined input signal vector $x_n(k)$ by the following equation:

$$r_{p-1}(k)=[x^T(k)x(k-1),x^T(k)x(k-2),\ldots,x^T(k)x(k-p+1)]^T;$$

letting a matrix $[x(k),x(k-1),\ldots,x(k-p+1)]$ of p combined input signal vectors counted back from said discrete time k be represented by X(k), setting the step size $\alpha$ in the range of $0<\alpha 2 1\ 2$ and defining a residual echo vector e(k) by the following equation on the basis of p residual echoes counted back from said discrete time k:

$$e(k)=[e(k),(1-\alpha)e(k-1),\ldots,(1-\alpha)^{p-1}e(k-p+1)]^T,$$

said step (i) includes a step of calculating a pre-filter coefficient vector $g_p(k)=[\beta_1,\ldots,\beta_p]^T$ using said pre-filter coefficients $\beta_1, \ldots, \beta_p$ as its elements by solving the following simultaneous linear equations with p unknowns:

$$[X^T(k)X((k)]g_p(k)=e(k);$$

letting a pre-filter conductor coefficient vector be represented by $f_{p-1}(k)$, said step (j) includes a step generating smoothing coefficients $s_i(k)$ by smoothing said pre-filter coefficients $\beta_i$ by the following equation:

$$\begin{aligned}S_i(k) &= s_{i-1}(k-1) + \alpha\beta_i(k) \quad \text{for } 2 < i < p\\ &= \alpha\beta_i(k) \quad \text{for } i=1;\end{aligned}$$

said step (k) includes a step of adjusting an approximate estimated impulse vector z(k) approximately a combined estimated impulse response vector $\hat{h}(k)$, by the following equation:

$$z(k+1)=z(k)+\{\beta_p(k)+\beta_{p-1}(k-1)+\ldots+\beta_2(k-p+2)+\beta_1(k-p+1)\}x(k-p+1) =z(k)+s_p(k)x(k-p+1); \text{ and}$$

said step (f) includes a step of calculating said smoothing coefficient vector $s_{p-1}(k-1)$ using said smoothing coefficients $s_i(k)$ for $i=1,\ldots,p-1$, as its elements, by the following equation:

$$s_{p-1}(k-1)=[s_1(k-1),s_2(k-1),\ldots,s_{p-1}(k-1)]^T$$

and calculating said supplementary estimated echo by an inner product $r_{p-1}^T(k)s_{p-1}(k-1)$.

6. The method of claim 3 or 5, wherein said step of solving said simultaneous linear equations with p unknown includes a step of calculating a forward linear prediction coefficient vector $a_p(k)$ of said combined input signal vector x(k), its minimum value of the sum of a posteriori prediction-error squares F(k), a backward linear prediction coefficient vector $b_p(k)$ of said vector x(k) and its minimum value of the sum of a posteriori prediction-error squares B(k) and, letting a pre-filter conductor coefficient vector by $f_{p-1}(k)$, calculating said pre-filter coefficient vector $g_p(k)$ from a recursion formula composed of the following two equations:

$$g_p(k) = (1-\alpha)\begin{bmatrix}0\\f_{p-1}(k-1)\end{bmatrix} + \frac{a_p^T(k)e(k)}{F(k)}a_p(k)$$

$$\begin{bmatrix}f_{p-1}(k-1)\\0\end{bmatrix} = g_p(k-1) - \frac{b_p^T(k)e(k)}{b(k-)}b_p(k-1)$$

7. The method claim 1 or 4, wherein the step (a) includes the step of:

(a-1) adding a variation to cross-correlation between received signals of the respective channels to produce the input signals $x_n(k)$ of the respective channels n, where $n=1,\ldots,N$.

8. The method of claim 7, wherein, said step (a-1) is a step of applying said input signals to time-variant filters each having a different time-variant characteristic for said each channel, thereby converting said input signals into signals $\bar{x}_1(k), \bar{x}_2(l), \ldots, \bar{x}_x(k)$ expressed below to add said variation to the cross-correlation between said input signals of said respective channels:

$$\bar{x}_1(k) = q_1(k)*x_1(k)$$
$$\bar{x}_1(k) = q_2(k)*x_2(k)$$
$$\vdots$$
$$\bar{x}_N(k) = q_N(k)*x_N(k)$$

where $q_1(k), q_2(k), \ldots, q_N(k)$ indicate impulse responses of said time-variant filters and * indicates a convolution.

9. The method of claim 7, wherein, said step (a-1) is a step of multiplying said input signals by different functions $u_1(k), u_2(k), \ldots, u_N(k)$, respectively, thereby converting said input signals into signals $\bar{x}_1(k), \bar{x}_2(k), \ldots, \bar{x}_N(k)$ satisfying the following equations to add said variation to the cross-correlation between said input signals of said respective channels:

$$\bar{x}_1(k) = u_1(k)\cdot x_1(k)$$
$$\bar{x}_2(k) = u_2(k)\cdot x_2(k)$$
$$\vdots$$
$$\bar{x}_N(k) = u_N(k)\cdot x_N(k)$$

10. The method of claim 7, wherein, said step (a-1) is a step of adding said input signals with different functions $n_1(k), n_2(k), \ldots, n_N(k)$, respectively, thereby converting said input signals into signals $x_1(k), x_2(k), \ldots, x_N(k)$ satisfying the following equations to add said variation to the cross-correlation between said input signals of said respective channels:

$$x_1(k) = x_1(k) + n_1(k)$$

-continued $$x_2(k) = x_2(k) + n_2(k)$$
$$\vdots$$
$$x_N(k) = x_N(k) + n_N(k)$$

11. The method of claim 7, wherein, said step (a-1) is a step of subjecting frequency characteristics of said input signals to time-variant frequency axis expansion or compression processing different for each channel, thereby converting said input signals into signals $x_1(k), x_2(k), \ldots, x_N(k)$, to add said variation to the cross-correlation between said input signals of said respective channels.

12. An N-channel echo canceller comprising:

N loudspeakers for radiating input signals $x_n(k), n=1, \ldots, N$, as acoustic signals of respective channels, said input signals being inputted as samples every discrete time k and N being an integer equal to or greater than 2;

a microphone for picking up said N acoustic signals propagating thereto over N echo paths from said N loudspeaker to obtain en echo y(k);

a vector combining part for obtaining a combined input signal vector $x(k)=[x_1^T(k), x_2^T(k), \ldots, x_N^T(k)]^T$ by combining input signal vectors $x_n(k)$ of said N channels, each composed of an input signal sequence $x_n(k), x_n(k-1), \ldots, x_n(k-L_n+1)$ counted $L_n-1$ back from said discrete time k in each of said N channels;

an estimated echo generating part which has a combined estimated impulse response vector $\hat{h}(k)$ obtained by combining estimated impulse response vectors $\hat{h}(k), n=1, \ldots, N$ of N estimated echo paths corresponding to said N echo paths, each of said N estimated echo paths having $L_n$ taps, and into which said combined input signal vector x(k) is inputted to generate an estimated echo $\hat{y}(k)$;

a subtractor for obtaining a residual echo e(k) by subtracting said estimated echo $\hat{y}(k)$ from said echo y(k) provided from said microphone;

a cross-correlation variation extracting part for extracting a variation in the cross-correlation between said input signals of said N channels on the basis of said residual echo e(k) and said combined input signal vector x(k) and for generating an adjustment vector v(k); and an adjusting part for adjusting said combined estimated impulse response vector $\hat{h}(k)$ by said adjustment vector v(k) to obtain a combined estimated response vector $\hat{h}(k+1)$ for use at the next time k+1.

13. The echo canceller of claim 12, wherein, setting p to an integer equal to or greater than 2 but smaller than $L=L_1+L_2+\ldots+L_N$, letting a matrix $[x(k), x(k-1), \ldots, x(k-p+1)]$ of p combined input signal vectors counted back from said discrete time k be represented by X(k), letting a pre-filter coefficient vector using pre-filter coefficients $\beta_1, \ldots, \beta_p$ as its elements be represented by $g_p(k)=[\beta_1, \ldots, \beta_p]^T$, setting the step size $\alpha$ in the range of $0<\alpha<2$ and letting a residual echo vector e(k) be defined by the following equation using p residual echoes counted back from said discrete time k:

$$e(k)=[e(k),(1-\alpha)e(k-1),\ldots,(1-\alpha)^{p-1}e(k-p+1)]^T$$

said cross-correlation variation extracting part includes a cross-correlation variation coefficient calculating part for obtaining said pre-filter coefficient vector $g_p(k)$ by solving the following simultaneous linear equation with p unknowns:

$$[X^T(k)X(k)]g_p(k)=e(k)$$

and a cross-correlation variation emphasized vector generating part for calculating said adjustment vector v(k) by the following equation through the use of said pre-filter coefficient vector $g_p(k)$:

$$v(k)=\beta_1 x(k)+\beta_2 x(k-1)+\ldots+\beta_p x(k-p+1);$$

and said adjusting part includes means for adjusting said combined estimated impulse response vector $\hat{h}(k)$ by the following equation:

$$\hat{h}(k+1)=\hat{h}(k)+\alpha v(k).$$

14. An N-channel echo canceller comprising:

N loudspeakers for radiating input signals $x_n(k), n=1, \ldots, N$, as acoustic signals of respective channels, said input signals being inputted as samples every discrete time k and N being an integer equal to or greater than 2;

a microphone for picking up said N acoustic signals propagating thereto over N echo paths from said N loudspeaker to obtain en echo y(k);

a vector combining part for obtaining a combined input signal vector $x(k)=[x_1^T(k), x_2^T(k), \ldots, x_N^T(k)]^T$ by combining input signal vectors $x_n(k)$ of said N channels, each composed of an input signal sequence $x_n(k), x_n(k-1), \ldots, x_n(k-L_n+1)$ counted $L_n-1$ back from said discrete time k in each of said N channels;

an approximate estimated echo path adjusting part which has set therein a combined approximate impulse response vector z(k) obtained by combining approximate estimated impulse response vectors $z_n(k), n=1, \ldots, N$, of N estimated echo paths corresponding to said N echo paths, each of said N estimated echo paths having $L_n$ taps, and into which said combined input signal vector x(k) is inputted to calculate an approximate estimated echo by a convolution $z^T(k)x(k)$;

a auto-correlation calculating part for calculating an auto-correlation vector $r_{p-1}(k)$ of said combined input signal vector x(k);

an adder for calculating the sum of said approximate estimated echo and a supplementary estimated echo and for outputting it as a combined estimated echo $\hat{y}(k)$ and said N estimated echo paths corresponding to said N echo paths;

a subtractor for obtaining a residual echo e(k) by subtracting said combined estimated echo $\hat{y}(k)$ from said echo y(k) obtained in said microphone;

a cross-correlation variation coefficient calculating part for detecting, as pre-filter coefficients $\beta_1, \ldots, \beta_p$, variations in the cross-correlation between current and previous ones of said combined input signal vector x(k) through the use of said residual echo e(k) and said combined input signal vector x(k);

a smoothing coefficient vector generating part for generating a smoothing coefficient vector $s_{p-1}(k)$ by smoothing said pre-filter coefficients;

an approximate estimated echo path adjusting part for adjusting said approximate estimated impulse response vector z(k) on the basis of said smoothing coefficient vector $s_{p-1}(k)$ and a previous one of said previous combined input signal vector x(k-p+1) and for outputting an approximate estimated impulse response vector z(k+1) for use at the next time k+1; and A convoluting part for calculating the inner product of said auto-correlation vector $r_{p-1}(k)$ and said smoothing coefficient vector $s_{p-1}(k)$ to obtain said supplementary estimated echo for use at said time k.

15. The echo canceller of claim 14, wherein:

setting p to an integer equal to or greater than 2 but smaller than $L=L_1+L_2+\ldots+L_N$, said auto-correlation calculating part includes means for calculating said auto-correlation vector $r_{p-1}(k)$ of said combined input signal vector $x_n(k)$ by the following equation:

$$r_{p-1}(k)=[x^T(x)k-1),x^T(k)x(k-2),\ldots,x^T(k)x(k-p+1)]^T;$$

letting a matrix $[x(k),x(k-1),\ldots,x(k-p+1)]$ of p discrete time k be represented by X(k), setting the step size α in the range of 0<α2 and defining a residual echo vector e(k) by the following equation on the basis of p residual echoes counted back from said discrete time k:

$$e(k)=[e(k),(1-\alpha)e(k-1),\ldots,(1-\alpha)^{p-1}e(k-p+1)]^T,$$

said cross-correlation variation coefficient calculating part includes means for calculating a pre-filter coefficient vector $g_p(k)=[\beta_1,\ldots,\beta_p]^T$ using said pre-filter coefficients $\beta_1,\ldots,\beta_p$ as its elements by solving the following simultaneous linear equations with p unknowns:

$$[X^T(k)X(k)]g_p(k)=e(k)$$

letting a pre-filter conductor coefficient vector be represented by $f_{p-1}(k)$, said smoothing coefficient vector generating part includes means for generating smoothing coefficients $s_i(k)$ by smoothing said pre-filter coefficients $\beta_1$ by the following equation:

$$s_i(k)=s_{i-1}(k-1)+\alpha\beta_i(k) \text{ for } 2\leq i\leq p\ =\alpha\beta_i(k) \text{ for } i=1;$$

said approximate estimated echo path adjusting part includes means for adjusting said approximate estimated impulse response vector z(k) approximately a combined estimated impulse response vector $\hat{h}(k)$, by the following equation:

$$z(k+1)=z(k)+\{\beta_p(k)+\beta_{p-1}(k-1)+\ldots+\beta_2(k-p+2)+\beta_1(k-p+1)x(k-p+1)\}=z(k)+s_p(k)x(k-p+1); \text{ and}$$

said convoluting part includes means for calculating said smoothing coefficient vector $s_{p-1}$ using said smoothing coefficients $s_i(k)$ (i=1, ..., p_1) as its elements, by the following equation:

$$s_{p-1}(k-1)=[s_1(k-1),s_2(k-1),\ldots,s_{p-1}(k-1)]^T$$

and for calculating said supplementary estimated echo by an inner product $r_{p-1}(k)s_{p-1}^T(k-1)$.

16. The echo canceller of claim 13 or 15, wherein said means for calculating said pre-filter coefficient vector $g_p(k)$ by solving said simultaneous linear equation with p unknowns includes means for calculating a forward linear prediction coefficient vector $a_p(k)$ of said combined input signal vector x(k), its minimum value of the sum of a posteriori prediction-error squares F(k), a backward linear prediction coefficient vector $b_p(k)$ of said vector x(k) and its minimum value of the sum of a posteriori prediction-error squares B(k) and for calculating said pre-filter coefficient vector $g_p(k)$ from a recursion formula composed of the following two equations:

$$g_p(k)=(1-\alpha)\begin{bmatrix}0\\f_{p-1}(k-1)\end{bmatrix}+\frac{a_p^T(k)e(k)}{F(k)}a_p(k)$$

$$\begin{bmatrix}f_{p-1}(k-1)\\0\end{bmatrix}=g_p(k-1)-\frac{b_p^T(k-1)e(k-1)}{B(k-1)}b_p(k-1)$$

where $f_{p-1}(k)$ is a pre-filter conductor coefficient vector.

17. The echo canceller of claim 12 or 14 further comprising a cross-correlation variation adding part for adding a cross-correlation variation to said input signal of each of said N channels.

18. The echo canceller of claim 17, wherein, said cross-correlation variation adding part includes time-variant filter means of different impulse responses $q_1(k), q_2(k), \ldots, q_N(k)$, for adding said variation to the cross-correlation between said input signals of said respective channels by converting said input signals into signal $\bar{x}_1(k), \bar{x}_2(k), \ldots, \bar{x}_N(k)$ expressed as follows:

$$\bar{x}_1(k) = q_1(k)*x_1(k)$$
$$\bar{x}_2(k) = q_2(k)*x_2(k)$$
$$\vdots$$
$$\bar{x}_N(k) = q_N(k)*x_N(k)$$

where * indicates a convolution.

19. The echo canceller of claim 17, wherein, said cross-correlation variation adding part includes means for adding said variation to the cross-correlation between said input signals of said respective channels by multiplying said input signals by different functions $u_1(k), u_2(k), \ldots, u_N(k)$, respectively, thereby converting said input signals into signals $\bar{x}_1(k), \bar{x}_2(k), \ldots, \bar{x}_N(k)$ which satisfy the following equations:

$$\bar{x}_1(k) = u_1(k)*x_1(k)$$
$$\bar{x}_2(k) = u_2(k)*x_2(k)$$
$$\vdots$$
$$\bar{x}_N(k) = u_N(k)*x_N(k).$$

20. The echo canceller of claim 17, wherein, said cross-correlation variation adding part includes means for adding said variation to the cross-correlation between said input signals of said respective channels by adding said input signals with difference functions $n_1(k), n_2(k), \ldots, n_N(k)$, respectively, thereby converting said input signals to signals $x_1(k), x_2(k), \ldots, x_N(k)$ which satisfy the following equations:

$$x_1(k) = x_1(k)*x_1(k)$$
$$x_2(k) = x_2(k)*x_2(k)$$
$$\vdots$$
$$x_N(k) = x_N(k)*x_N(k).$$

21. The echo canceller of claim 17, wherein said cross-correlation variation adding part includes means for adding said variation to the cross-correlation between said input signals of said respective channels by subjecting frequency characteristics of said input signals to time-variant frequency axis expansion or compression processing different for each channel, thereby converting said input signals into signals $\bar{x}_1(k), \bar{x}_2(k), \ldots, \bar{x}_N(k)$.

* * * * *